US011534901B2

(12) United States Patent
Polakowski et al.

(10) Patent No.: US 11,534,901 B2
(45) Date of Patent: Dec. 27, 2022

(54) BATTERY CHARGER HAVING A BATTERY CHARGING TERMINAL, AN INPUT TERMINAL, AND AN OUTPUT TERMINAL

(71) Applicant: MILWAUKEE ELECTRIC TOOL CORPORATION, Brookfield, WI (US)

(72) Inventors: Matthew R. Polakowski, Greenfield, WI (US); Gareth Mueckl, Milwaukee, WI (US); Justin D. Dorman, Wauwatosa, WI (US); Patrick S. Lueck, Appleton, WI (US); Douglas G. Schwartz, Richfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 710 days.

(21) Appl. No.: 15/943,768

(22) Filed: Apr. 3, 2018

(65) Prior Publication Data
US 2018/0294662 A1 Oct. 11, 2018

Related U.S. Application Data

(60) Provisional application No. 62/484,178, filed on Apr. 11, 2017.

(51) Int. Cl.
*H02J 7/00* (2006.01)
*B25F 5/00* (2006.01)
*H01M 10/42* (2006.01)
*H02J 7/34* (2006.01)

(52) U.S. Cl.
CPC .............. *B25F 5/00* (2013.01); *H02J 7/0044* (2013.01); *H02J 7/0045* (2013.01); *H01M 10/4257* (2013.01); *H02J 7/00* (2013.01); *H02J 7/342* (2020.01); *H02J 2207/40* (2020.01)

(58) Field of Classification Search
CPC ........................................ H02J 7/0044
USPC ........................................... 320/107
See application file for complete search history.

(56) References Cited

U.S. PATENT DOCUMENTS

| 10,283,817 | B2 * | 5/2019 | Barnett | ............... H01M 50/502 |
| 2005/0276042 | A1 * | 12/2005 | Ho | ........................ F21V 15/01 |
| | | | | 362/205 |
| 2006/0267547 | A1 * | 11/2006 | Godovich | ......... H01M 10/0445 |
| | | | | 320/107 |

(Continued)

FOREIGN PATENT DOCUMENTS

KR 20130017110 2/2013

OTHER PUBLICATIONS

International Search Report and Written Opinion for Application No. PCT/US2018/025781 dated Jul. 20, 2018, 14 pages.

*Primary Examiner* — Yalkew Fantu
(74) *Attorney, Agent, or Firm* — Michael Best & Friedrich LLP

(57) ABSTRACT

A battery connector, an electrical combination and methods. The electrical combination may include a battery connector including a housing with a support portion for a battery pack, and a circuit supported by the housing, the circuit including a universal serial bus (USB) input terminal connectable to a USB cable for receiving power, a charging terminal connectable to a pack terminal of the battery pack, and a battery charging portion operable to receive power from the USB input terminal and to output a charging current to the charging terminal to charge the battery pack.

18 Claims, 28 Drawing Sheets

(56) References Cited

U.S. PATENT DOCUMENTS

| | | | |
|---|---|---|---|
| 2010/0190052 A1* | 7/2010 | Rajani | H01M 10/46 |
| | | | 429/178 |
| 2012/0224358 A1 | 9/2012 | Noble et al. | |
| 2013/0343042 A1 | 12/2013 | Windom | |
| 2014/0240967 A1 | 8/2014 | Sharrah et al. | |
| 2015/0271873 A1* | 9/2015 | Gray | H05B 1/0272 |
| | | | 219/211 |
| 2016/0072329 A1 | 3/2016 | Miller et al. | |
| 2016/0134144 A1 | 5/2016 | Miller et al. | |
| 2016/0197504 A1 | 7/2016 | Hsia et al. | |
| 2016/0241051 A1* | 8/2016 | Yang | H01M 10/44 |
| 2016/0248123 A1* | 8/2016 | Barnett | H01M 2/022 |

* cited by examiner

BATTERY CHARGER HAVING A BATTERY CHARGING TERMINAL, AN INPUT TERMINAL, AND AN OUTPUT TERMINAL

RELATED APPLICATIONS

The present application claims priority to U.S. Provisional Application No. 62/484,178, filed Apr. 11, 2017, the entire contents of which is hereby incorporated by reference.

FIELD OF THE INVENTION

The present invention relates to battery chargers and, more particularly, to a battery charger with a USB power input and one or more power outputs.

SUMMARY

In one independent aspect, an electrical combination may generally include a battery connector including a housing with a support portion for a battery pack, and a circuit supported by the housing, the circuit including a universal serial bus (USB) input terminal connectable to a USB cable for receiving power, a charging terminal connectable to a pack terminal of the battery pack, and a battery charging portion operable to receive power from the USB input terminal and to output a charging current to the charging terminal to charge the battery pack.

In another independent aspect, a method of charging a battery pack may be provided. The method may generally include providing a battery connector including a housing with a support portion for the battery pack and a circuit with a universal serial bus (USB) input terminal and a battery charging portion; supporting the battery pack on the support portion; electrically connecting the battery pack to the circuit of the battery connector; electrically connecting a USB cable between a power source and the USB input terminal of the battery connector; receiving, by the battery charging portion of the circuit, power from the USB input terminal; and outputting a charging current from the battery charging portion to the battery pack to charge the battery pack.

In yet another independent aspect, an electrical combination may generally include a battery connector separate from a powered device and including a housing with a support portion for a battery pack, and a circuit supported by the housing, the circuit including an input terminal connectable to a power source, a charging terminal connectable to a pack terminal of the battery pack, an output terminal electrically connectable to the powered device and operable to output power from the battery pack to the powered device, and a battery charging portion operable to receive power from the input terminal and to output a charging current to the charging terminal to charge the battery pack.

In a further independent aspect, a method of operating a powered device may be provided. The method may generally include providing a battery connector separate from the powered device and including a housing with a support portion for the battery pack and a circuit with an input terminal and a battery charging portion; supporting the battery pack on the support portion; electrically connecting the battery pack to the circuit of the battery connector; electrically connecting a power source to the input terminal of the battery connector; receiving, by the battery charging portion of the circuit, power from the input terminal; and outputting a charging current from the battery charging portion to the battery pack to charge the battery pack; electrically connecting an output terminal of the battery connector to the powered device; and outputting power to the powered device via the output terminal.

In another independent aspect, a battery connector may generally include a housing with a support portion for a power tool battery pack, the power tool battery pack being removably coupled to the housing, and a circuit supported by the housing, the circuit including a universal serial bus (USB) input terminal connectable to a USB cable for receiving power, a charging terminal connectable to a pack terminal of the power tool battery pack, and a battery charging portion operable to receive power from the USB input terminal and to output a charging current to the charging terminal to charge the power tool battery pack.

In yet another independent aspect, a battery connector may generally include a housing with a support portion for a battery pack; and a circuit supported by the housing, the circuit including a USB input terminal connectable to a USB cable for receiving power, a terminal connectable to a pack terminal of the battery pack, and a battery charging portion operable to receive power from the USB input terminal and to output a charging current to the terminal to charge the battery pack when connected.

In some constructions, the circuit may include an output terminal operable to output power (e.g., from a connected battery pack) to a powered device electrically connected to the output terminal. The battery connector may include an electronic controller operable to determine when power is being received at the USB input terminal and, when power is being received at the USB input terminal, to prevent power output to the output terminal. In other constructions, the circuit may be operable to allow power output to the output terminal when power is being received at the USB input terminal.

In some constructions, the controller may be operable to determine a power input and to control the battery charging portion to operate at a first charging rate based on a first power input (e.g., a low voltage DC input) and to operate at a second charging rate based on a second power input (e.g., an AC input), the first charging rate being different (e.g., lower) than the second charging rate.

In a further independent aspect, an electrical combination may generally include a garment; and a battery connector separate from the garment and operable to receive a battery pack and to supply power from the battery pack to the garment to adjust a temperature of the garment. The battery connector may include a housing with a support portion for the battery pack; and a circuit supported by the housing, the circuit including an input terminal connectable to a power source, a connector terminal connectable to a pack terminal of the battery pack, an output terminal operable to output power (e.g., from a connected battery pack) to the garment electrically connected to the output terminal, and a battery charging portion operable to receive power from the input terminal and to output a charging current to the terminal to charge the battery pack when connected.

In another independent aspect, a method of charging a battery pack may be provided. The method may generally include electrically connecting a USB cable between a power source and a USB input terminal of a battery connector; supporting a battery pack on the battery connector; electrically connecting the battery pack to a circuit of the battery connector; supplying power from the power source to the circuit; and outputting a charging current from a battery charging portion of the circuit to the battery pack to charge the battery pack.

In some embodiments, the method may further include determining a power input; and, with an electronic controller, controlling the battery charging portion to operate at a first charging rate based on a first power input (e.g., a low voltage DC input) and to operate at a second charging rate based on a second power input (e.g., an AC input), the first charging rate being different (e.g., lower) than the second charging rate.

In yet another independent aspect, a method of operating a temperature-controlled garment is provided. The method may generally include electrically connecting an input terminal of a battery connector to a power source; supporting a battery pack on the battery connector; electrically connecting the battery pack to a circuit of the battery connector; supplying power from the power source to the circuit; outputting a charging current from a battery charging portion of the circuit to the battery pack to charge the battery pack; electrically connecting an output terminal of the battery connector to the garment; and outputting power to the garment to adjust a temperature of the garment.

In some embodiments, the method may include determining when power is being received at the input terminal and, when power is being received at the input terminal, preventing power output to the output terminal. In other embodiments, the method may include simultaneously outputting a charging current to the battery pack to charge the battery pack and outputting power to the garment to adjust the temperature of the garment.

Other independent features and independent aspects of the invention may become apparent by consideration of the following detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

In addition, it should be understood that embodiments of the invention may include hardware, software, and electronic components or modules that, for purposes of discussion, may be illustrated and described as if the majority of the components were implemented solely in hardware. However, based on a reading of the detailed description, it should be recognized that, in at least one embodiment, electronic-based aspects of the invention may be implemented in software (e.g., instructions stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

FIGS. 1-10 illustrate a battery connector 10 operable to charge a battery pack 14 and/or for use with a battery pack 14 as a DC power source/supply. As described below in more detail, the illustrated connector 10 has a USB input, in addition to one or more output ports, to provide charging of the battery pack 14 through a USB cable using either a connection to a USB power output (e.g., a laptop) or to an AC adapter. The illustrated battery connector 10 allows for charging a power tool battery pack 14 using a USB input/low voltage DC input.

The illustrated connector 10 provides a battery charger that can also be used to power a temperature-controlled garment. The illustrated battery connector 10 along with the battery pack 14, such as a power tool battery pack, can be used as a power source to power other devices (e.g., heated jackets) through one output or to charge or operate a device on a USB output using the power from the connected battery pack 14.

Figure 22:
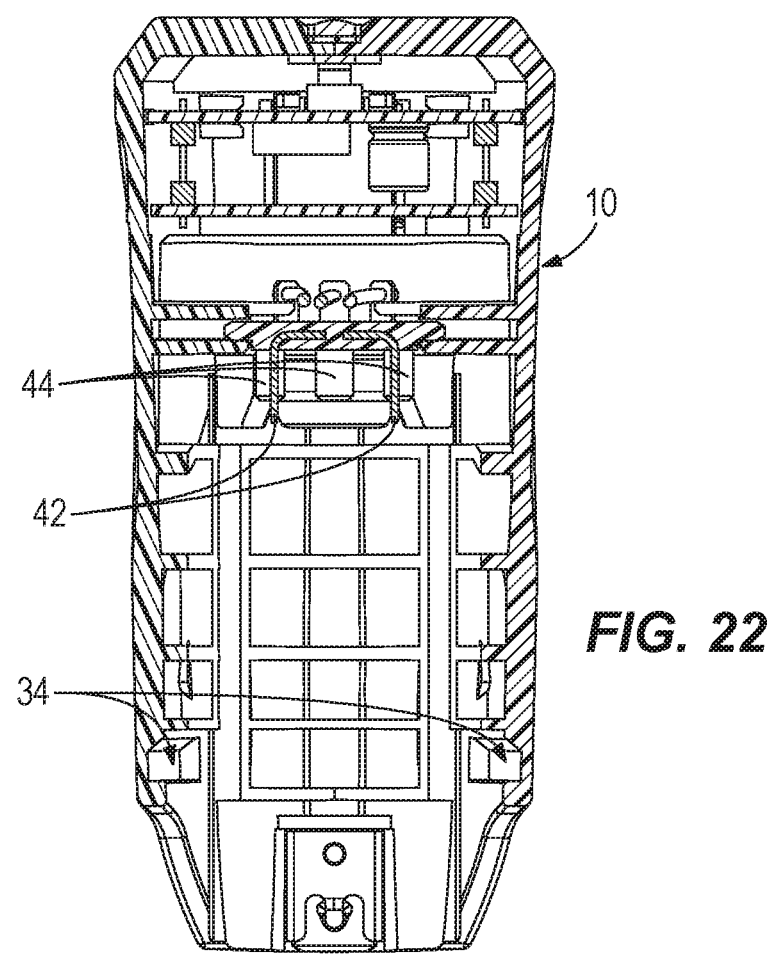
FIG. 22 is another cross-sectional view of the battery connector shown in FIG. 11.
Figure 23:
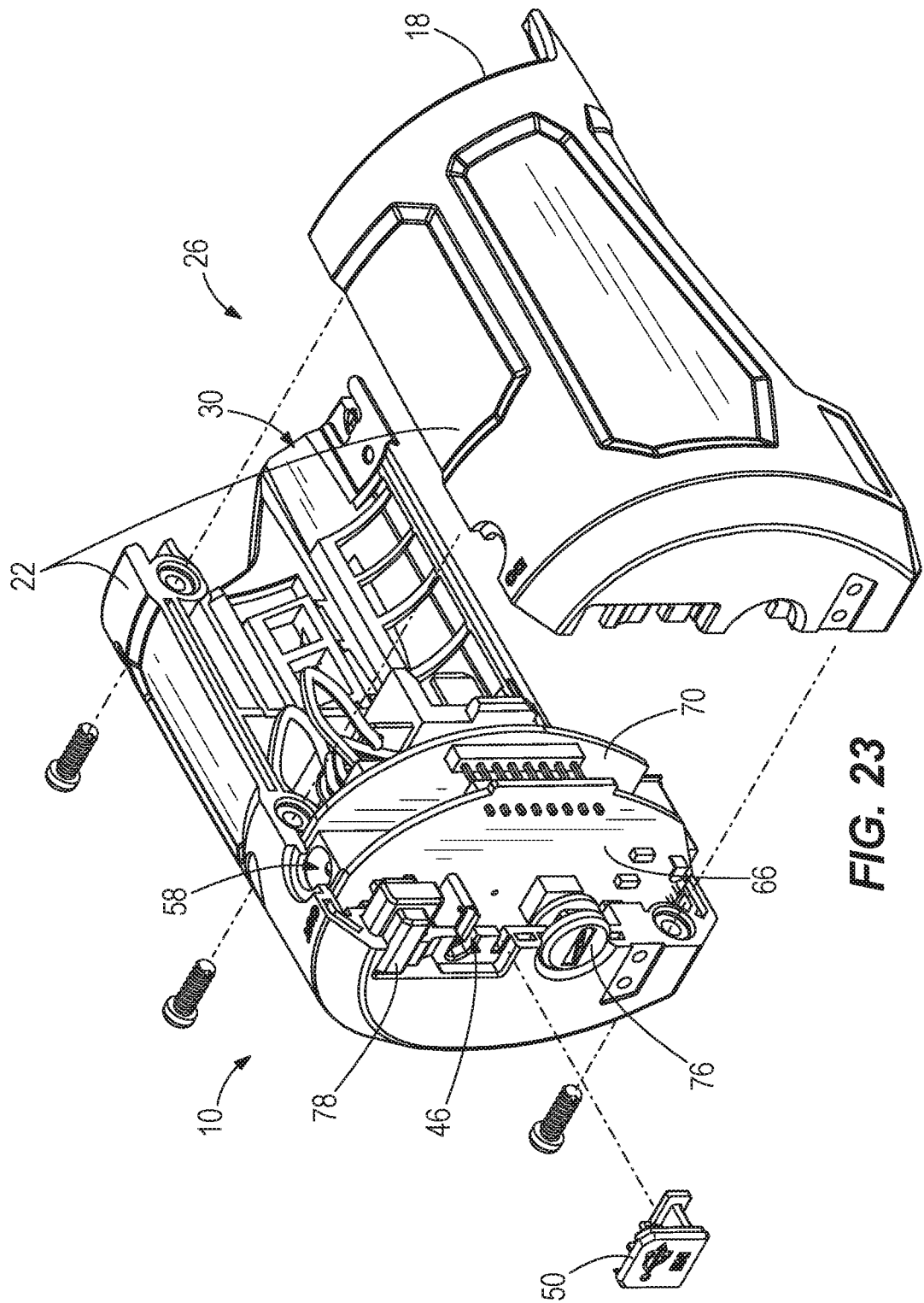
FIG. 23 is a partially exploded view of the battery connector shown in FIG. 11.
Figure 24:
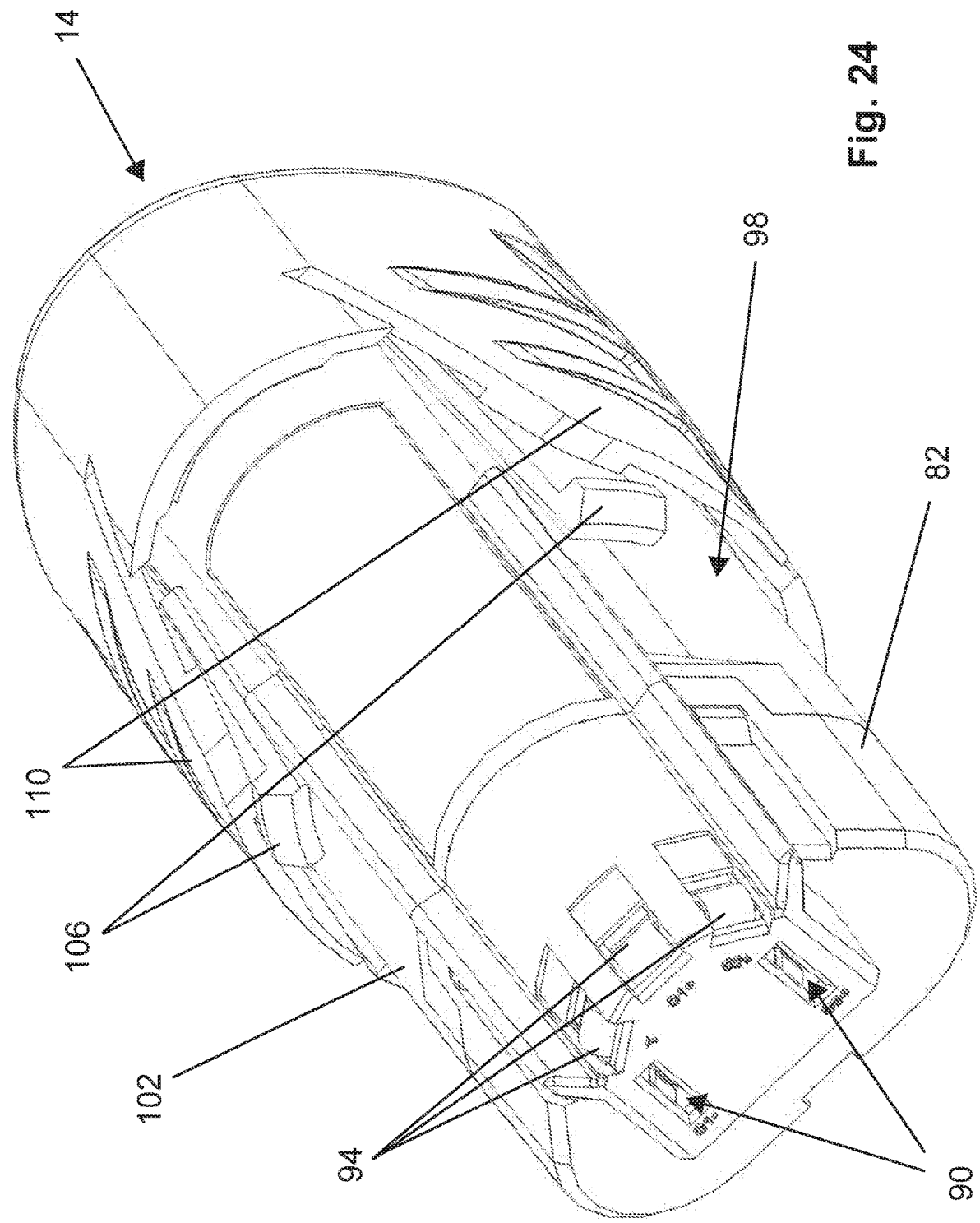
FIG. 24 is a perspective view of the battery pack shown in FIG. 1.
Figure 25:
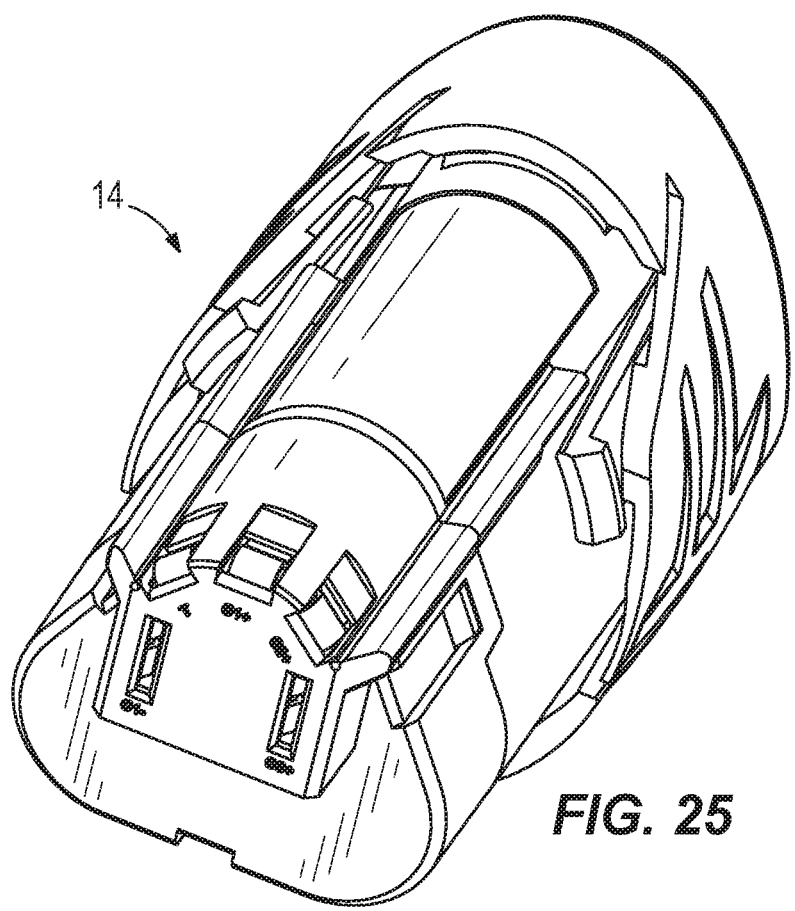
FIG. 25 is another perspective view of the battery pack shown in FIG. 24.
Figure 26:
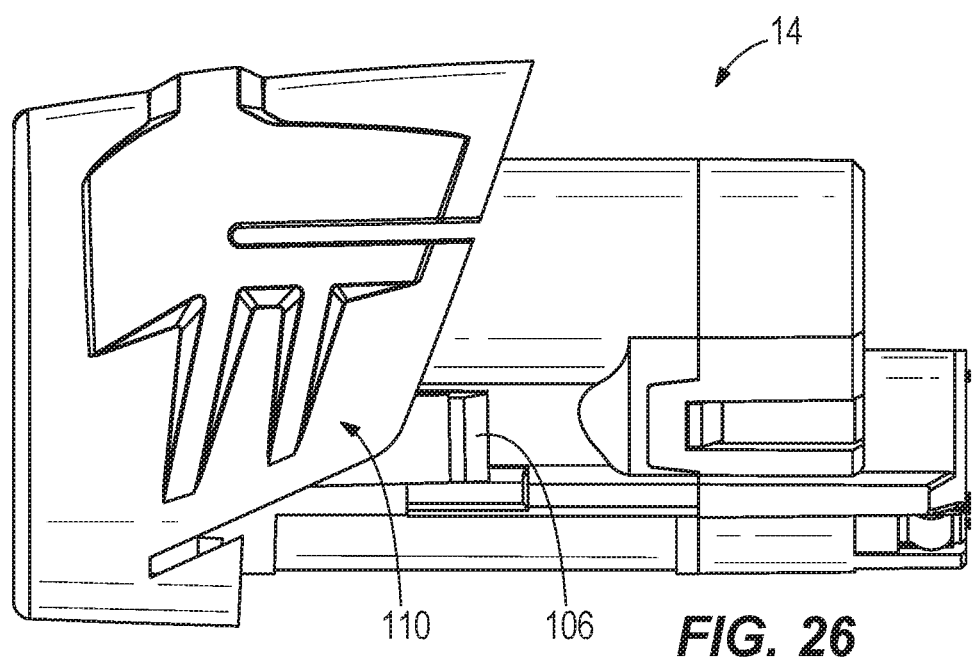
FIG. 26 is a side view of the battery pack shown in FIG. 24.
Figure 28:
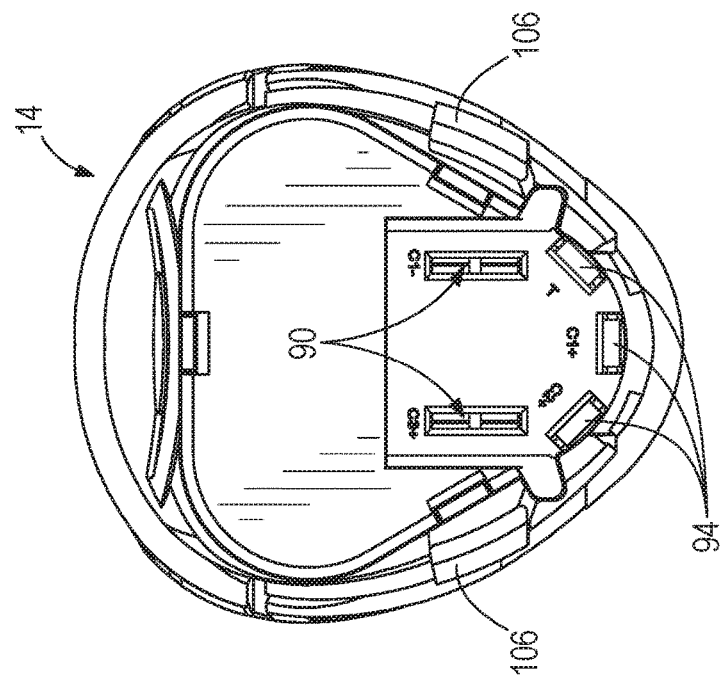
FIG. 28 is an end view of the battery pack shown in FIG. 24.
Figure 27:
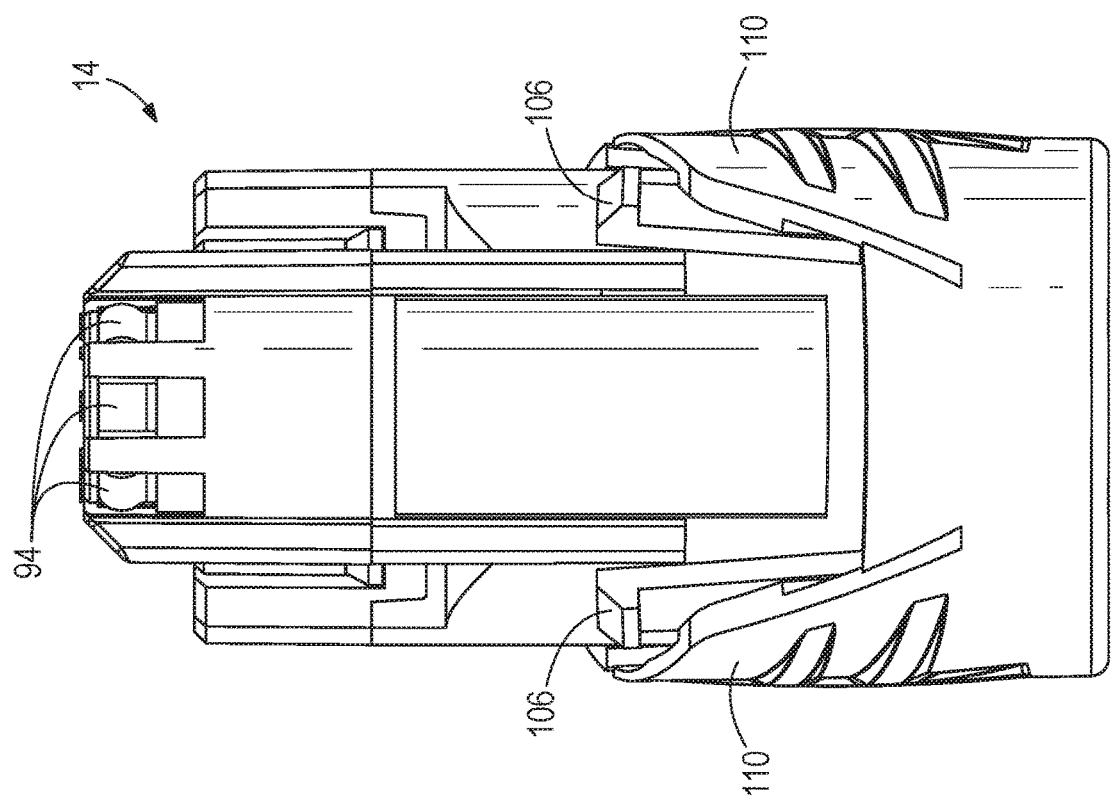
FIG. 27 is another side view of the battery pack shown in FIG. 24.

The connector 10 is shown in more detail in FIGS. 11-23 without the battery pack 14. The connector 10 includes a housing 18 formed of housing halves 22. The housing 18 provides a support portion 26 for the battery pack 14. In the illustrated construction, the support portion 26 includes a receptacle 30 for receiving a portion of the battery pack 14. A latching mechanism is provided between the connector 10 and the battery pack 14. The connector 10 provides a latching portion (e.g., one or more recesses 34 shown in FIGS. 10 and 22) cooperating with a latching portion on the battery pack 14.

Figure 32:
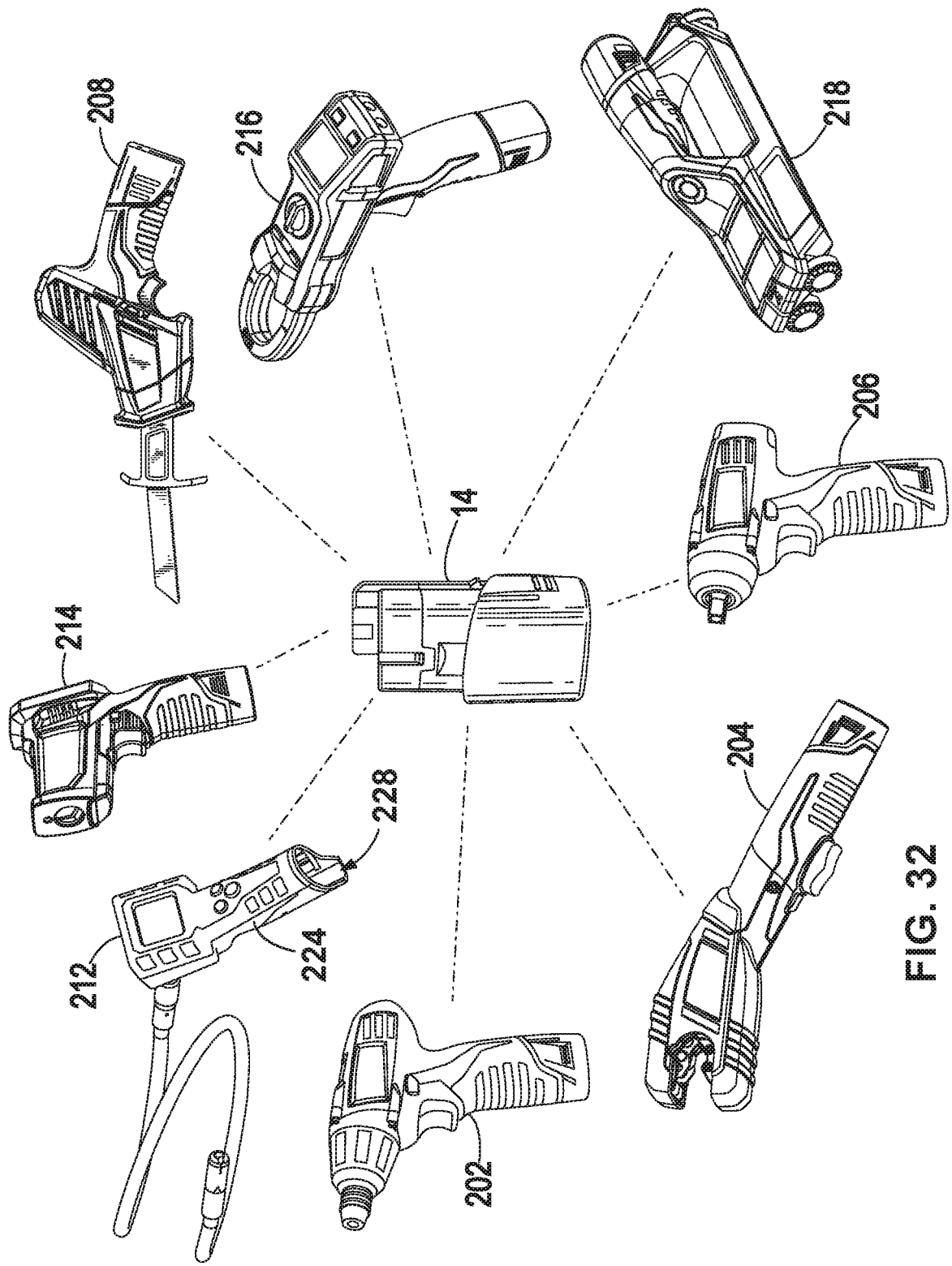
FIG. 32 is a perspective view of tools and devices usable with the battery pack shown in FIG. 1.
Figure 33:
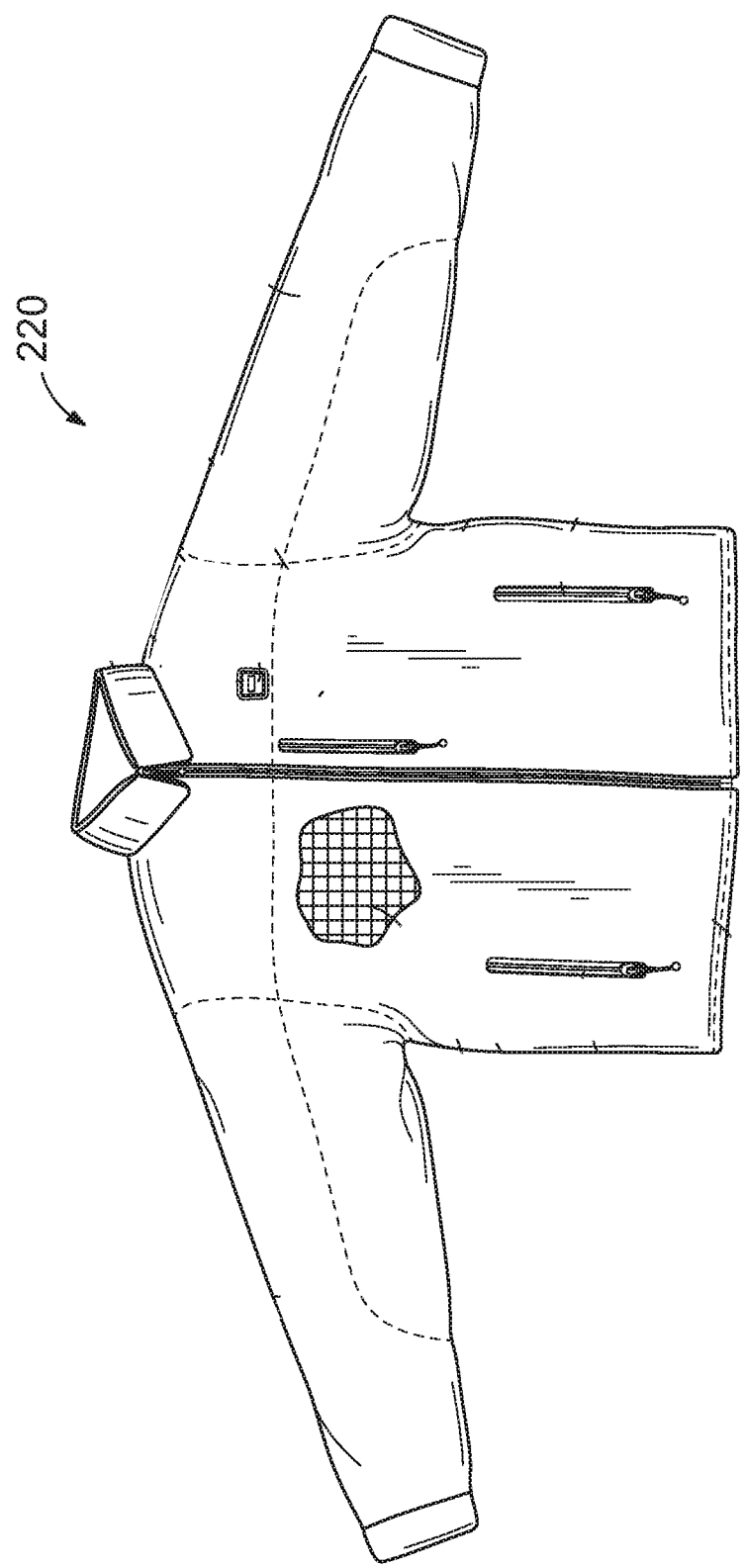
FIG. 33 is a front view of a heated garment usable with the battery connector and the battery pack shown in FIG. 1.

The connector 10 includes (see FIGS. 29A and 29B) an electrical circuit 38 connectable and operable to transfer power between the battery pack 14, a power source (not shown) and one or more connected powered devices (see FIGS. 32-33). Connector terminals (e.g., male blade power terminals 42, flat communication terminals 44) are operable to electrically connect the circuit 38 to terminals of the battery pack 14.

A power input port 46 is operable to electrically connect the circuit 38 to a power source (not shown) to receive power. In the illustrated construction, the input port 46 is a USB input port connectable to a USB cable (not shown). The USB cable is connectable to a USB output port to receive power from a DC power source (e.g., a low voltage DC power source, such as a computer, a laptop, etc.) or to an AC adapter to receive power from an AC power source. A cover 50 selectively covers and seals the input port 46 when the input port 46 is not connected to a cable.

The connector 10 includes one or more power output ports (e.g., two illustrated) to provide power to one or more separate powered devices through the circuit 38. One port is a USB power output port 54 connectable to a USB cable (not shown). Another port is a DC output port 58 connectable to a DC plug (not shown).

The circuit 38 includes a battery charging portion 60. The battery charging portion 60 is operable to receive power from the USB input port 46 and to output charging current to the connector power terminals 42 to charge the battery pack 14. In the illustrated construction, a different charge rate will be used based on the detected amount of power available.

Figure 30:
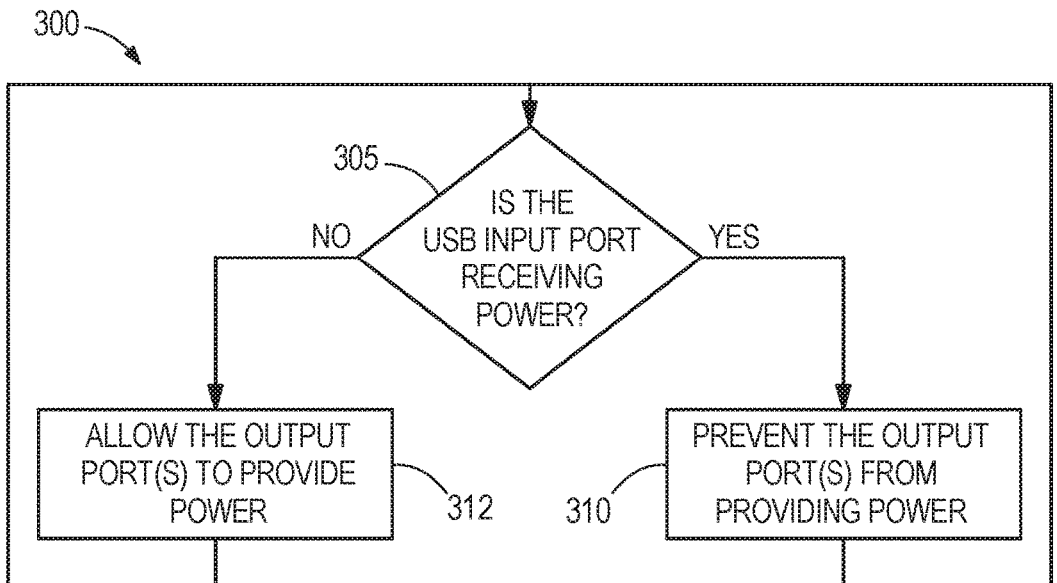
FIG. 30 is a flowchart illustrating a method for controlling power output performed by the connector shown in FIG. 1.

A connector electronic controller 62 (i.e., MCU 62) is operable to control operation of the connector 10. As shown in FIG. 30, in some embodiments, the controller 62 executes a method 300 to determine whether input power is being received by the input port 46 (at block 305). In some embodiments, when input power is being received, the controller 62 is operable to prevent power output to the output ports 54, 58 (at block 310). As indicated by FIG. 30, the controller 62 continues to monitor whether input power is being received. When input power is no longer being received, the controller 62 is operable to allow the output ports 54, 58 to provide power to a device coupled to the battery pack 14 (at block 312).

In other embodiments (not shown), rather than periodically monitoring whether input power is being received, the controller 62 may only determine this condition in response to an input (e.g., a plug being received in an output port 54, 58, the connector 10 being turned "ON" (by power switch 74), etc.). In other embodiments (not shown), the controller 62 may allow simultaneous charging of the battery pack 14 and power output to the output port(s) 54, 58.

Figure 31:
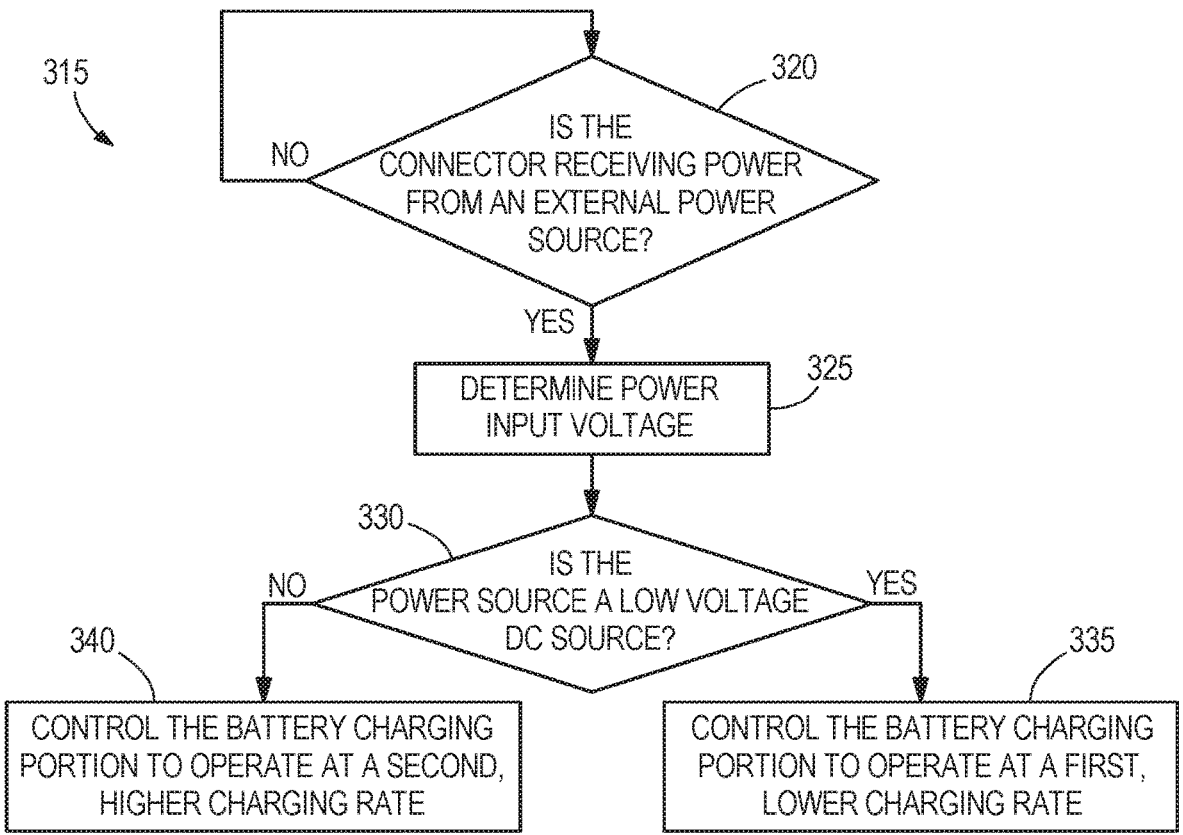
FIG. 31 is a flowchart illustrating a method for controlling charging of a battery pack performed by the connector shown in FIG. 1.

As shown in FIG. 31, in some embodiments, the controller 62 executes a method 315 to determine a power input voltage and to control the battery charging portion 60 to operate at a first, lower charging rate based on a low voltage DC input and to operate at a second, higher charging rate based on an AC input. With reference to FIG. 31, at block 320, the controller 62 determines whether the connector 10 is receiving power from a power source. When the connector 10 is not receiving power from a power source, the method 315 remains at block 320 to continue to monitor for a power source being coupled to the connector 10.

When the connector 10 is receiving power from a power source, at block 325, the controller 62 determines a power input voltage being provided by the power source. At block 330, the controller 62 determines whether the power source is a low voltage DC source (e.g., a device, such as a laptop computer, coupled to the connector 10 via a USB cable). When the power source is a low voltage DC source, at block 335, the controller 62 controls the battery charging portion 60 to operate at a first, lower charging rate.

On the other hand, when the charger is not a low voltage DC source, the controller 62 determines that the power source is higher voltage AC source. In such situations, at block 340, the controller 62 controls the battery charging portion to operate at a second, higher charging rate. Although block 330 of FIG. 31 is shown as determining whether the charger is a low voltage DC source, in some embodiments, at block 330, the controller 62 additionally or alternatively determines whether the power source is a higher voltage AC source. Accordingly, by executing the method 315, the controller 62 determines the power input voltage of the charger coupled to the connector 10 and controls the battery charging portion 60 to operate at a predetermined charging rate based on the power input voltage to the connector 10.

Components of the circuit 38 are provided on one or more (two illustrated) printed circuit boards (PCBs) 66, 70. A power switch 74 is operable to control power transfer in the connector 10. In the illustrated construction, the switch 74 is operable to control power output to the output port(s) 54, 58. A push button 76 operates the switch 74.

The connector 10 includes an indicator (e.g., one or more light-emitting diodes (LEDs)) to indicate a condition of the connector 10, the battery pack 14 and/or a powered device. The illustrated indicator includes a LED assembly 78 with a number of (e.g., two) LEDs providing a charging indication. The charging LED assembly 78 has a number of modes (e.g., unlit, lit, blinking/speed, color, etc.) to indicate different charging conditions. For example, a solid green light indicates charging is complete, a solid red light indicates charging, and blinking LEDs indicate a fault.

Another LED assembly 80 includes a number of (e.g., four) LEDs providing a fuel gauge for the battery pack 14. In the illustrated construction, when the switch 74 is "ON" and power is being output to the port(s) 54, 58, the fuel gauge LED assembly 80 is illuminated. In other constructions (not shown), the push button 76 may be illuminated to indicate such operations of the connector 10.

The battery pack 14 is illustrated in more detail in FIGS. 24-28. The battery pack 14 includes a housing 82 supporting a number of (e.g., three illustrated (see FIGS. 9-10)) rechargeable battery cells 86. In the illustrated construction, the cells 86 are lithium-ion battery cells, each having a nominal voltage of approximately 3.6 V to 4.4 V and, in one specific embodiment, 4.2 V, connected in series to provide a nominal voltage of approximately 12 V for the battery pack 14. In other constructions (not shown), the battery pack 14 may include fewer or more battery cells 14 connected in series, parallel or combination series-parallel, to provide a desired nominal voltage, capacity, etc., of the battery pack 14 to meet the requirement of specific applications. In other constructions (not shown), the battery cell(s) 86 may have a different chemistry (e.g., NiCd, NiMH, etc.), nominal voltage, etc.

Figure 1:
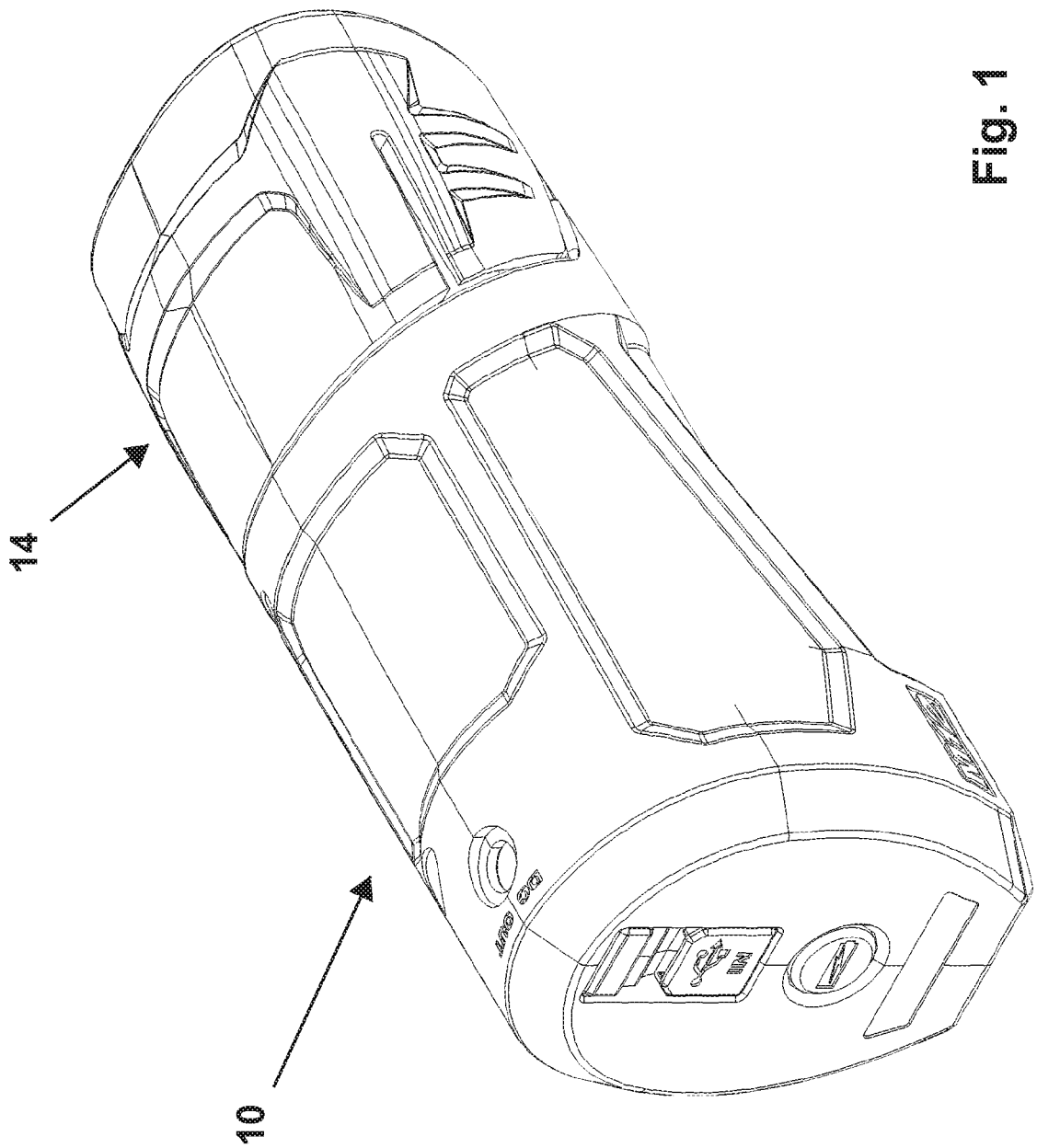
FIG. 1 is a perspective view of a battery connector and a battery pack.
Figure 2:
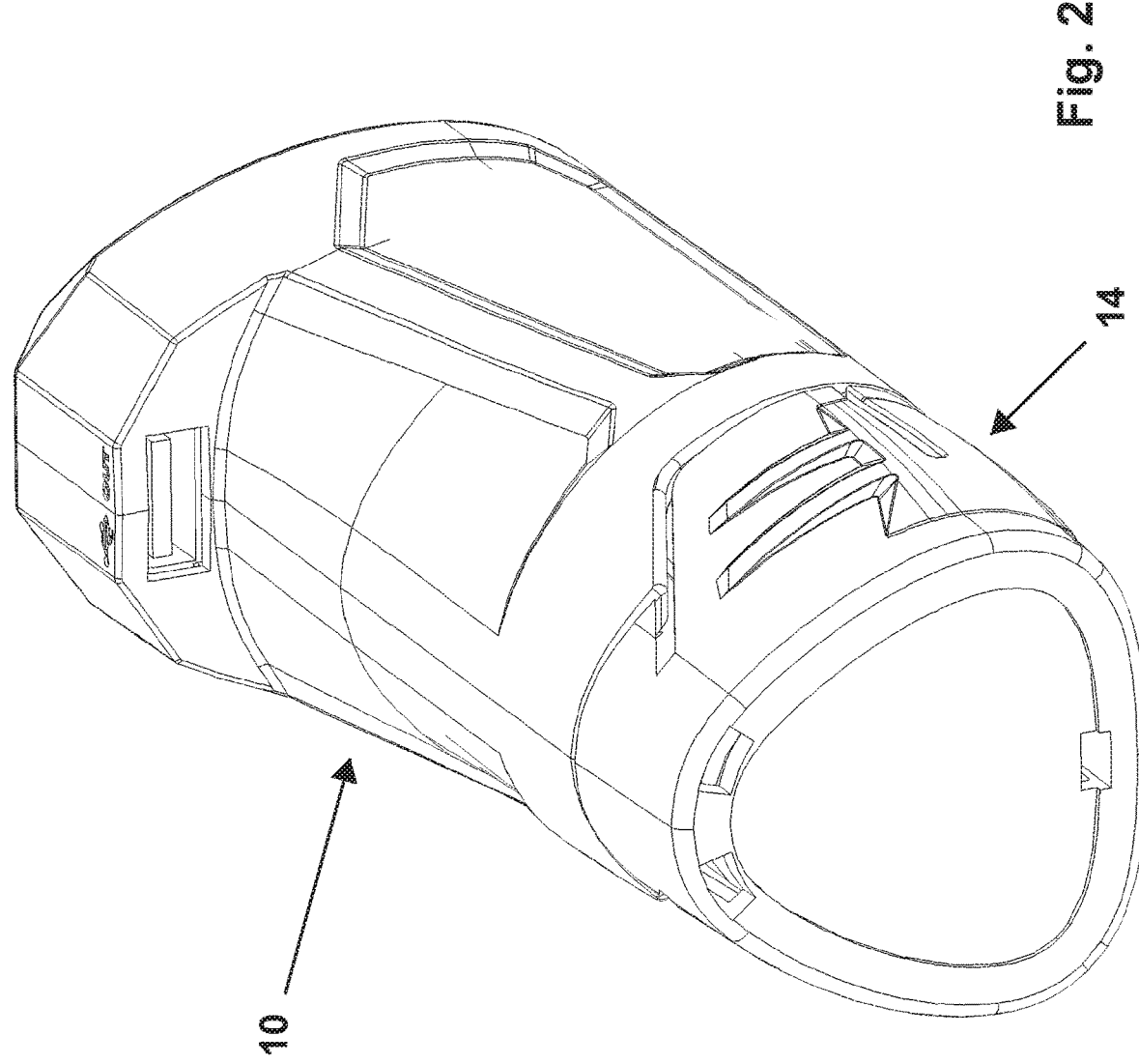
FIG. 2 is another perspective view of the battery connector and the battery pack shown in FIG. 1.
Figure 3:
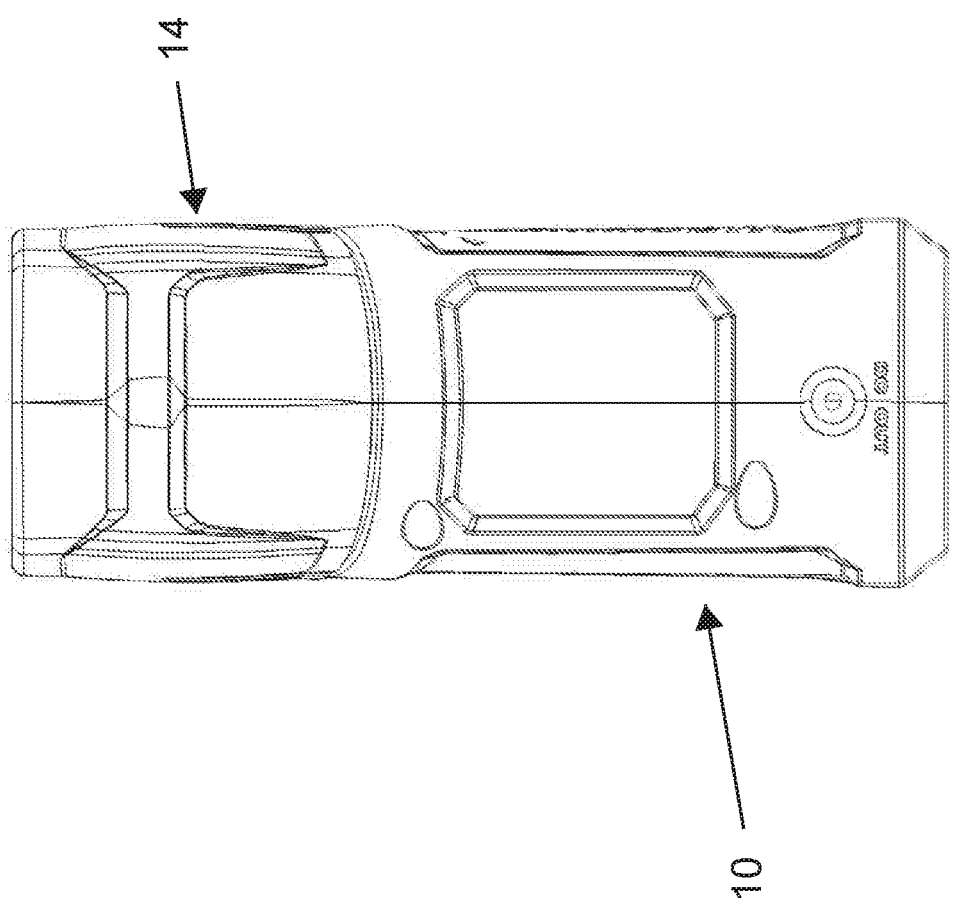
FIG. 3 is a side view of the battery connector and the battery pack shown in FIG. 1.
Figure 4:
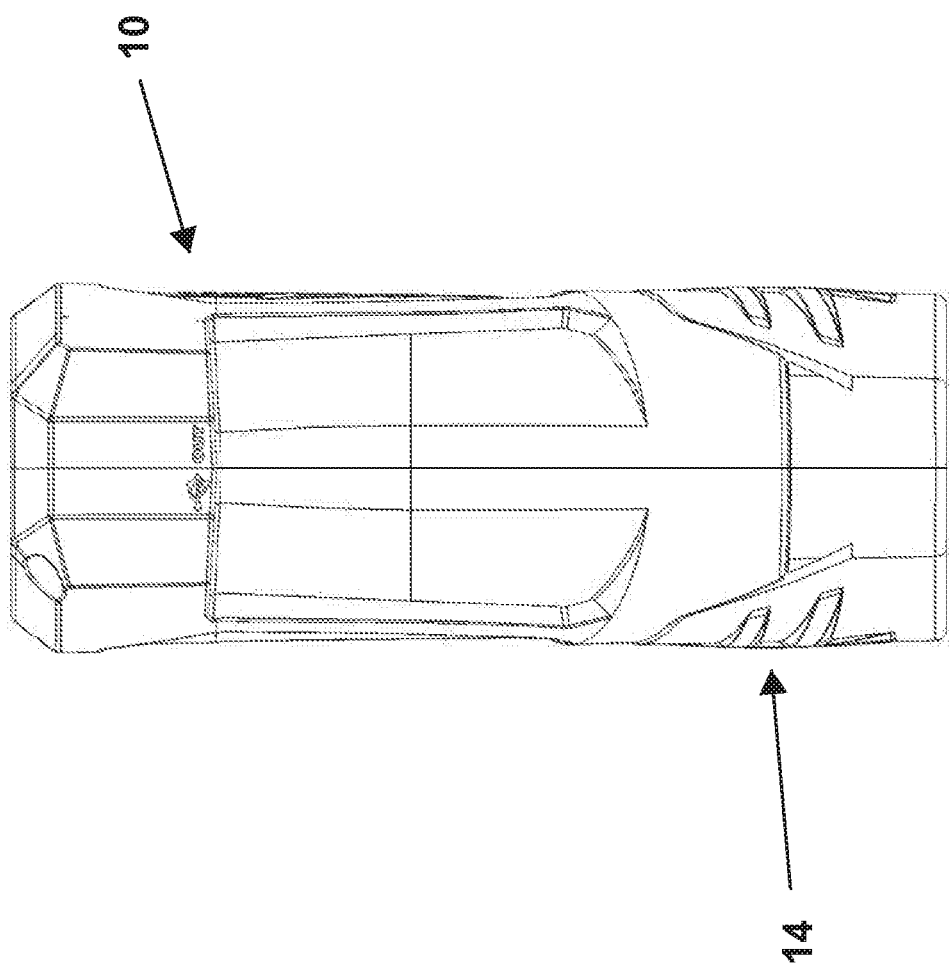
FIG. 4 is another side view of the battery connector and the battery pack shown in FIG. 1.
Figure 5:
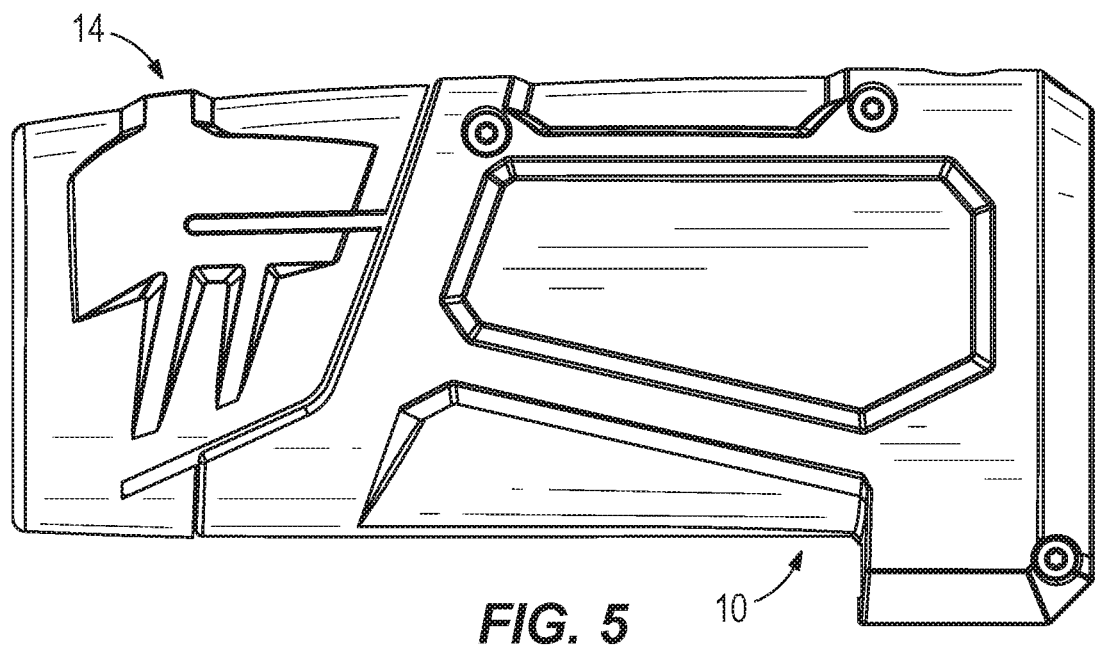
FIG. 5 is another side view of the battery connector and the battery pack shown in FIG. 1.
Figure 6:
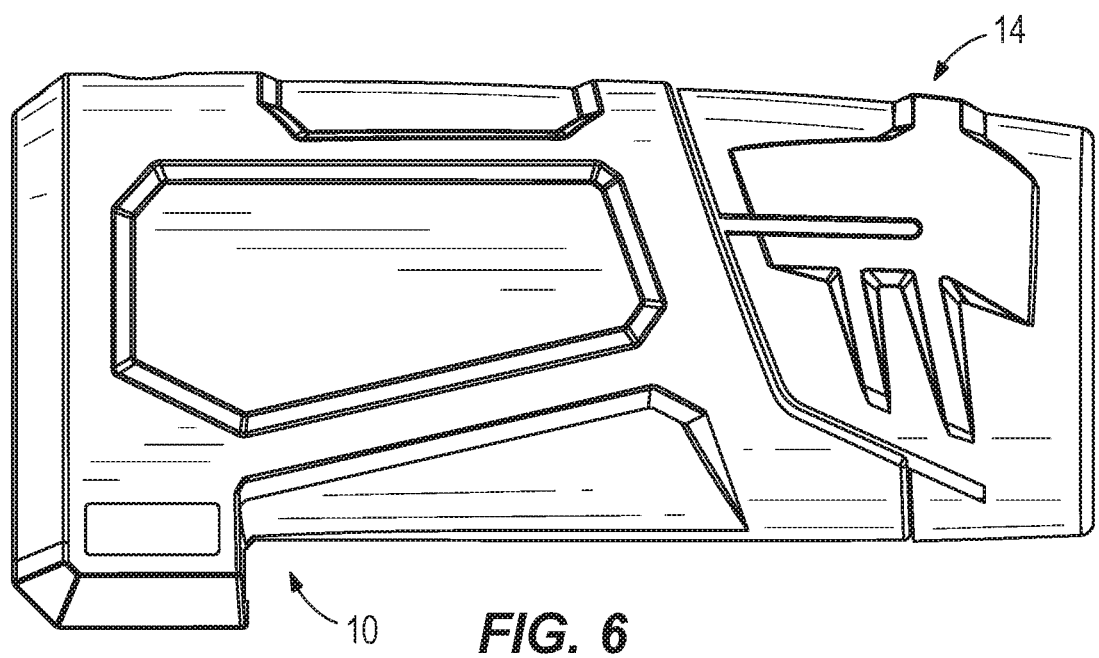
FIG. 6 is another side view of the battery connector and the battery pack shown in FIG. 1.
Figure 7:
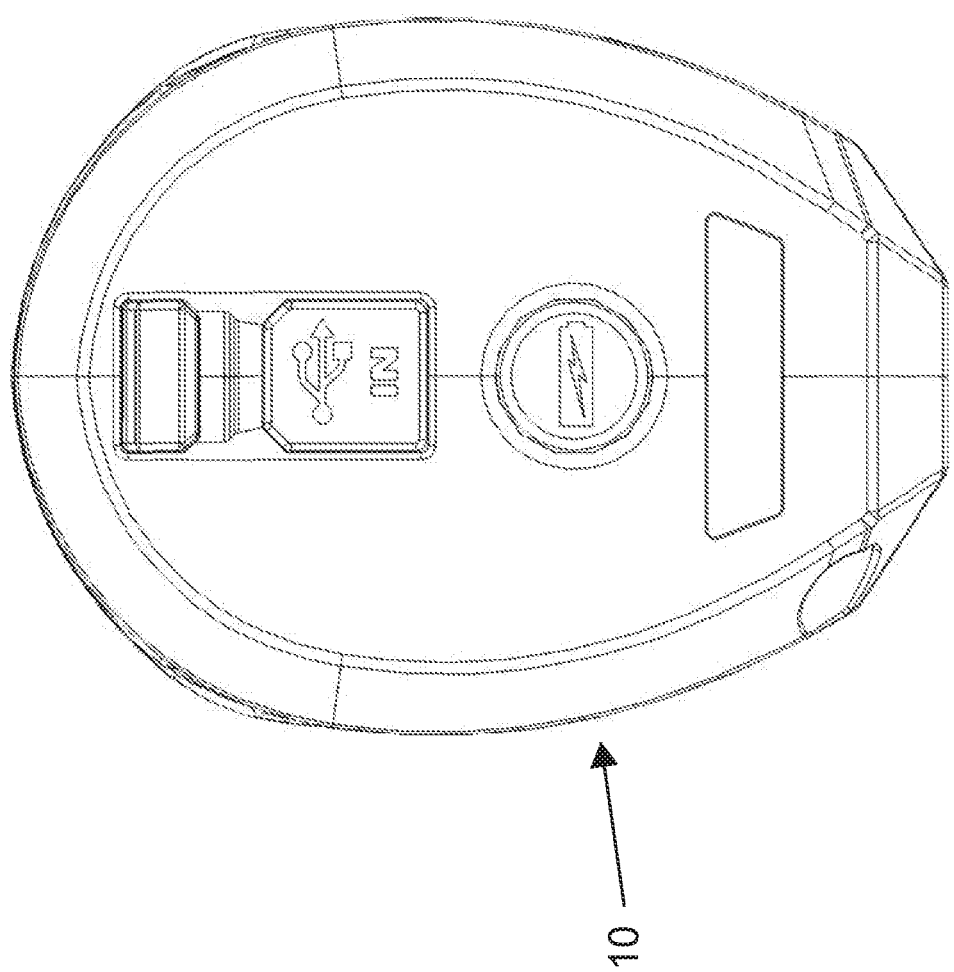
FIG. 7 is an end view of the battery connector and the battery pack shown in FIG. 1.
Figure 8:
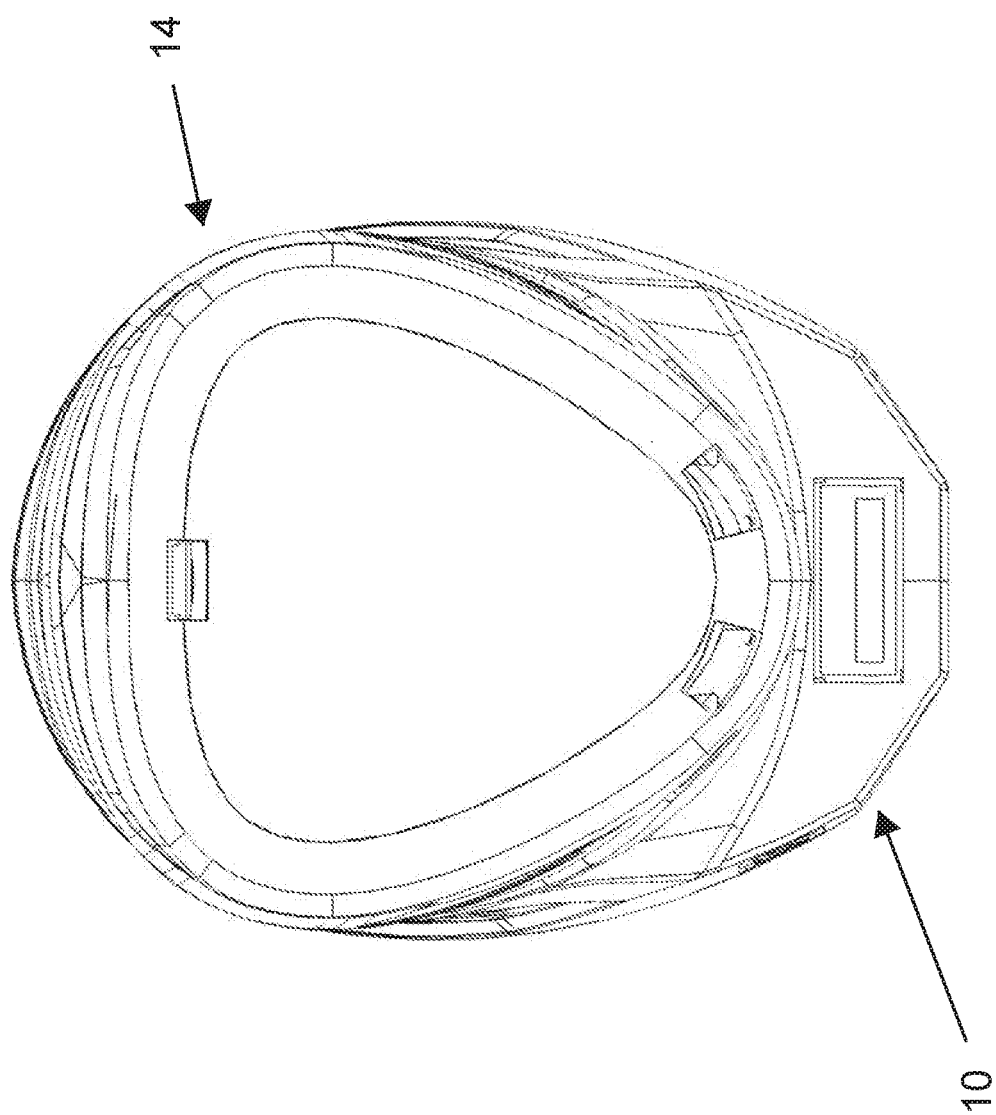
FIG. 8 is another end view of the battery connector and the battery pack shown in FIG. 1.
Figure 9:
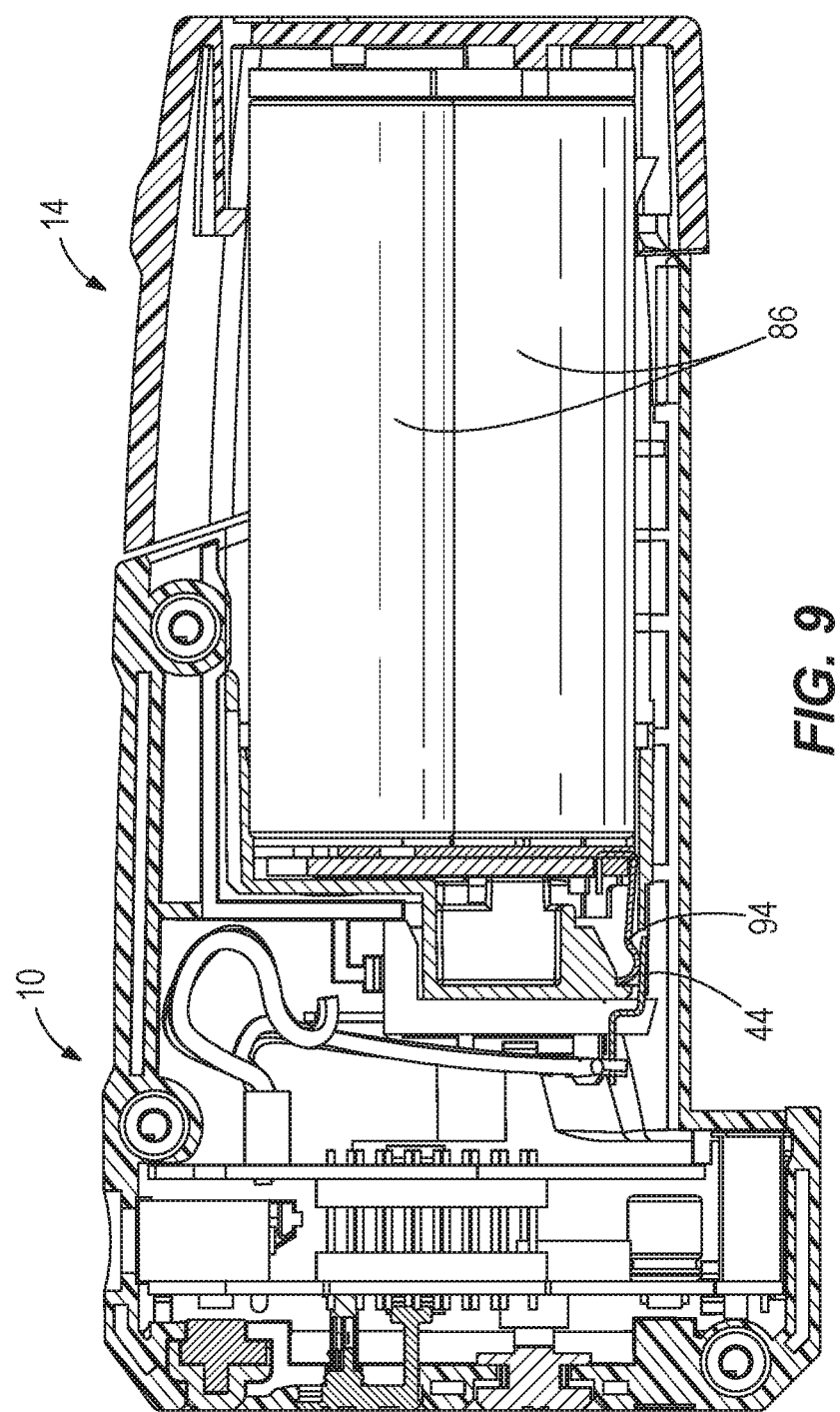
FIG. 9 is a cross-sectional view of the battery connector and the battery pack shown in FIG. 1.
Figure 10:
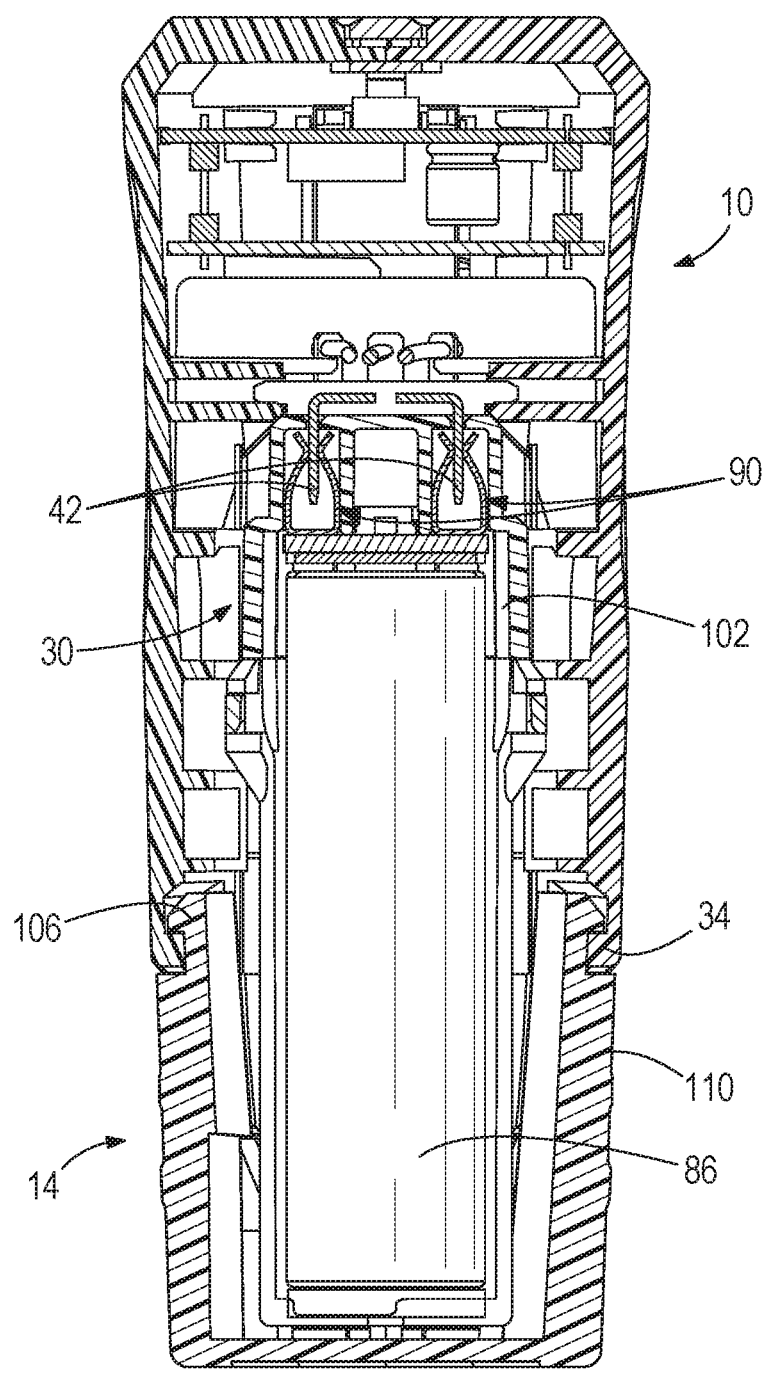
FIG. 10 is another cross-sectional view of the battery connector and the battery pack shown in FIG. 1.
Figure 11:
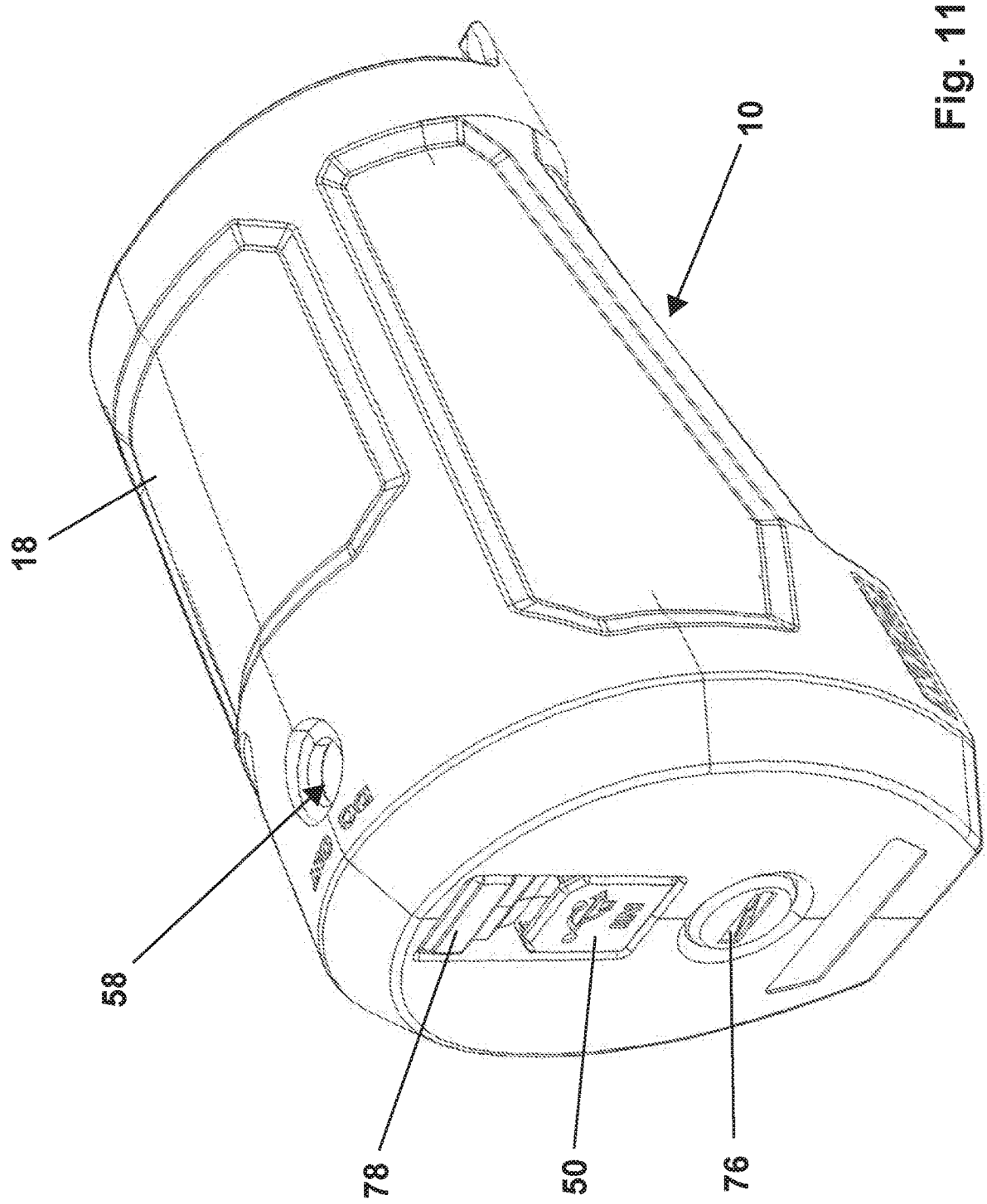
FIG. 11 is a perspective view of the battery connector shown in FIG. 1.
Figure 12:
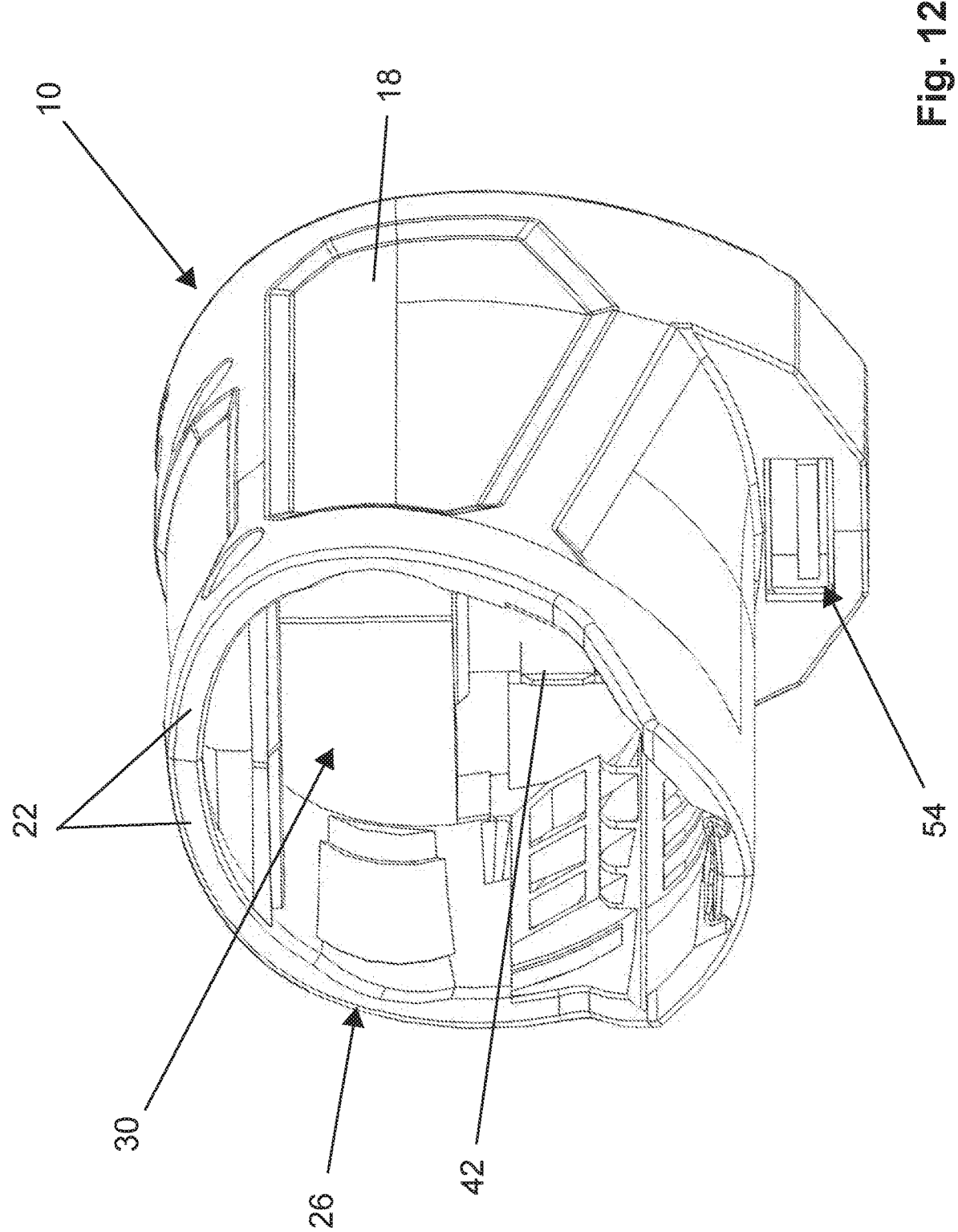
FIG. 12 is another perspective view of the battery connector shown in FIG. 11.
Figure 13:
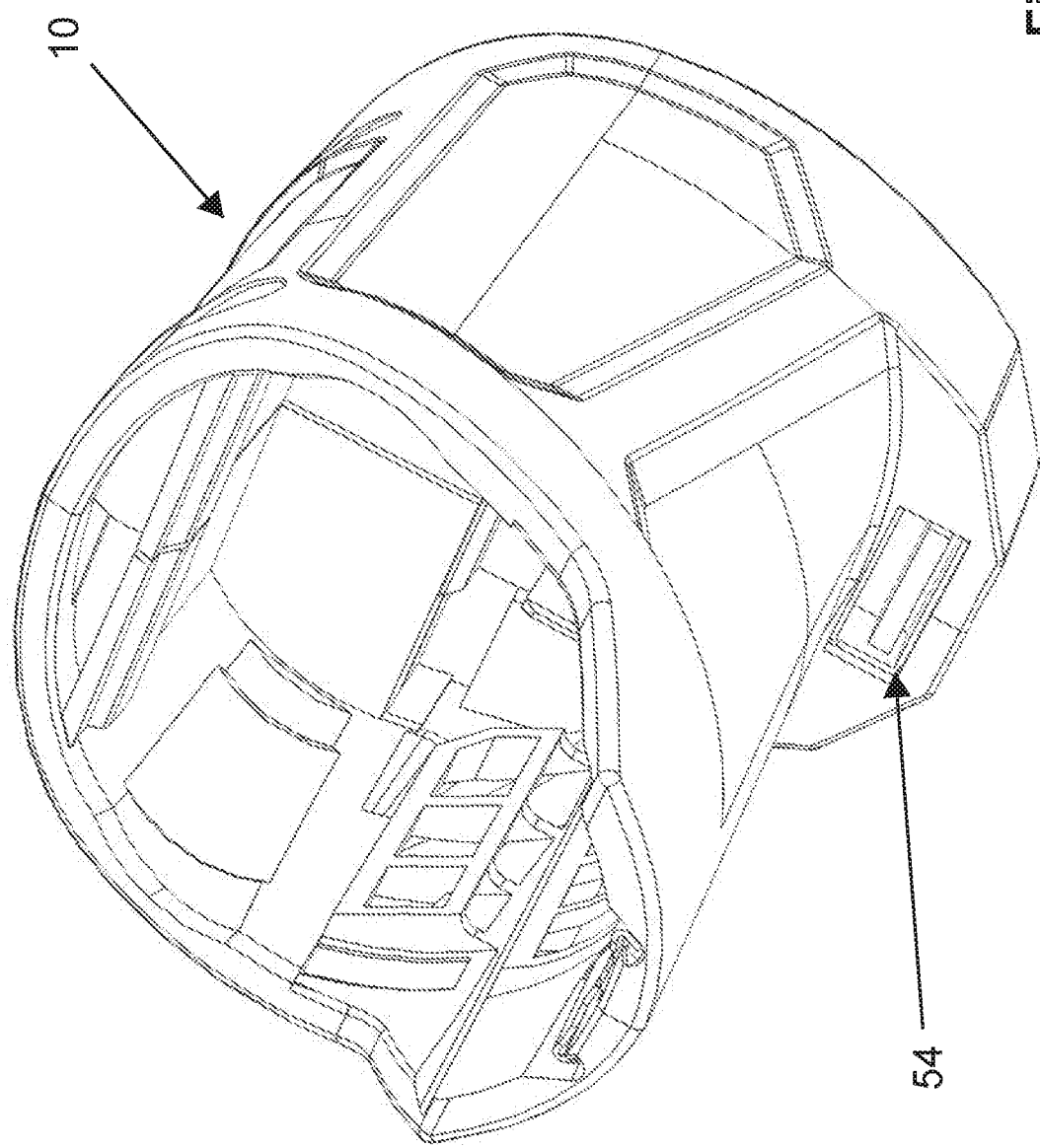
FIG. 13 is another perspective view of the battery connector shown in FIG. 11.
Figure 14:
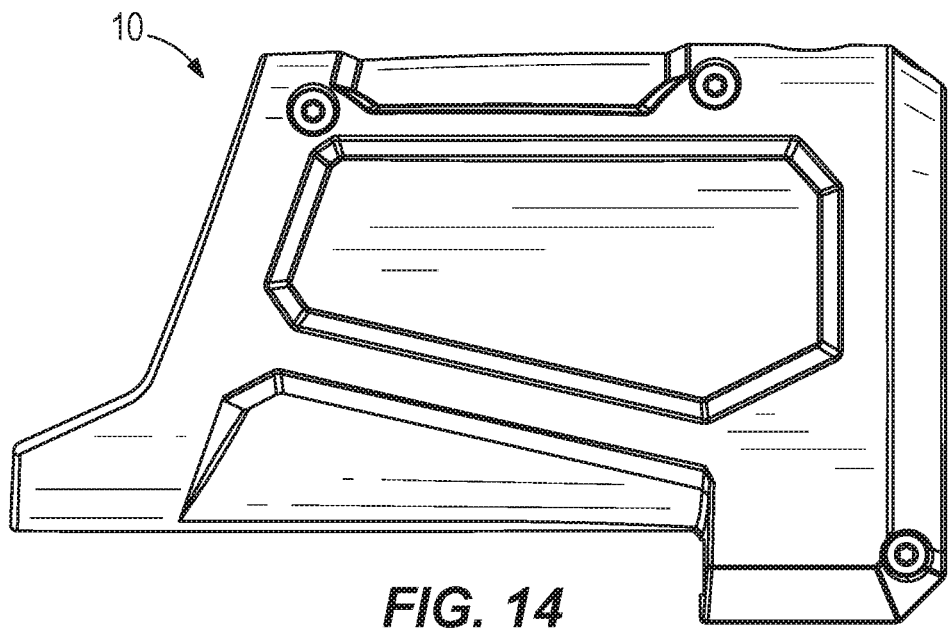
FIG. 14 is a side view of the battery connector shown in FIG. 11.
Figure 15:
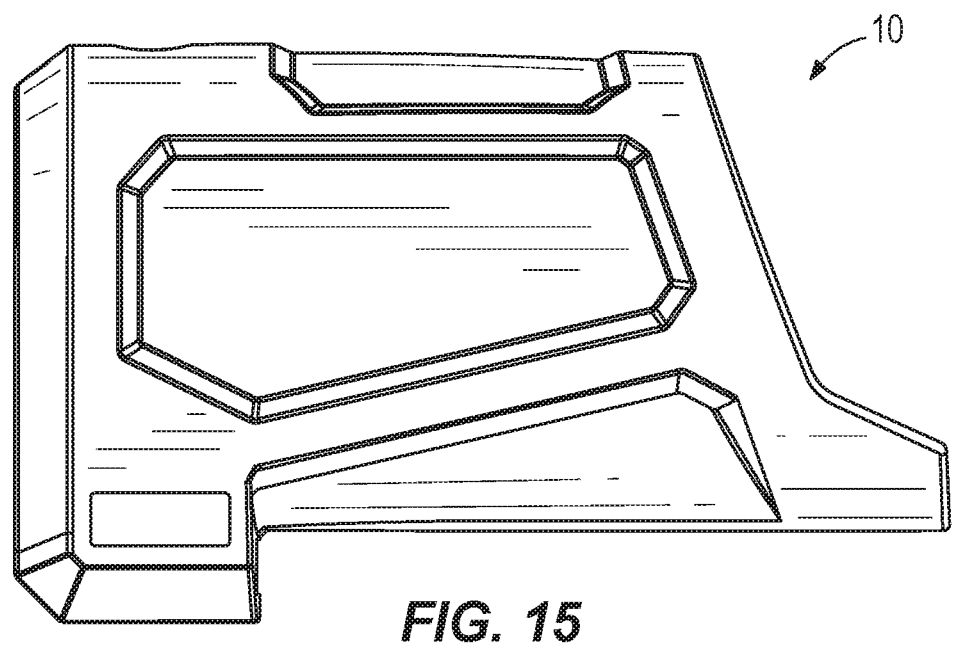
FIG. 15 is another side view of the battery connector shown in FIG. 11.
Figure 16:
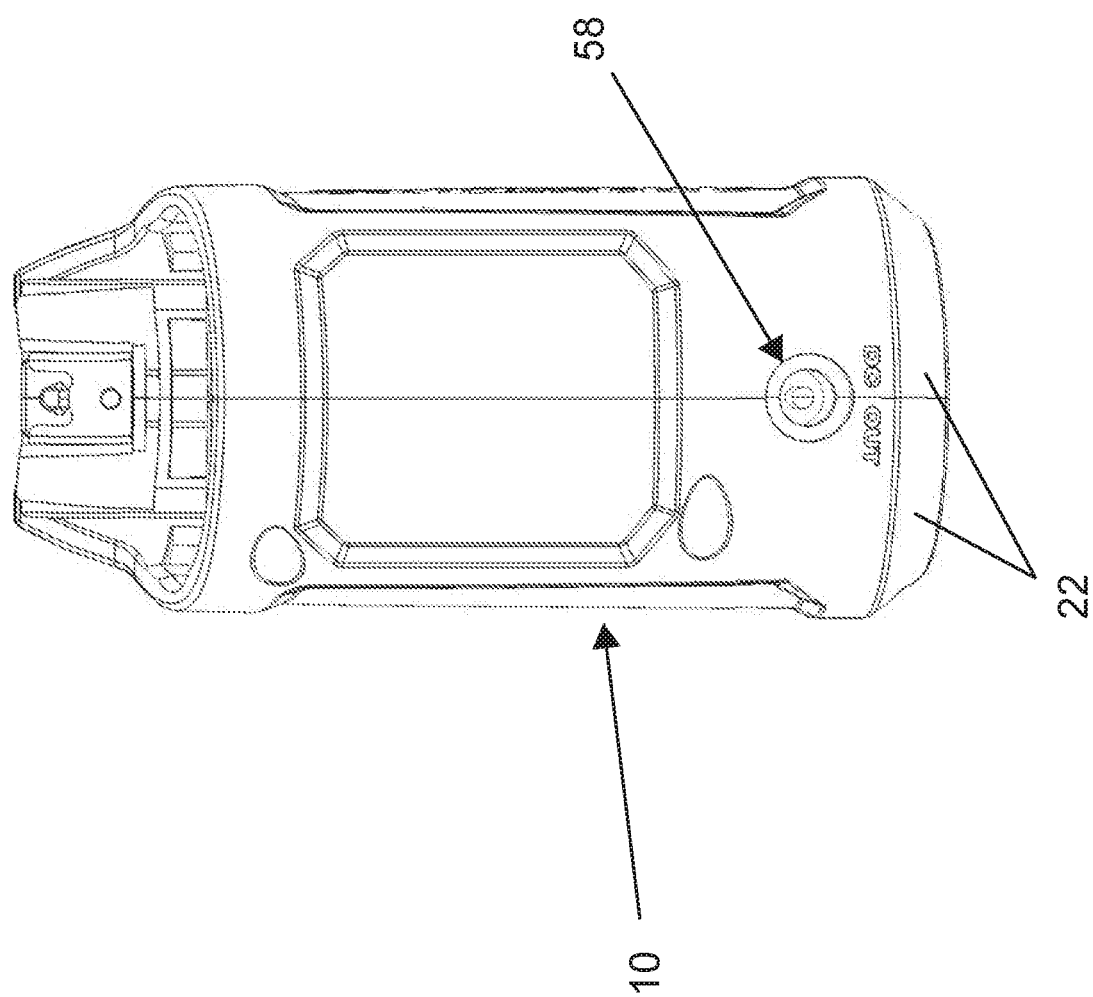
FIG. 16 is another side view of the battery connector shown in FIG. 11.
Figure 17:
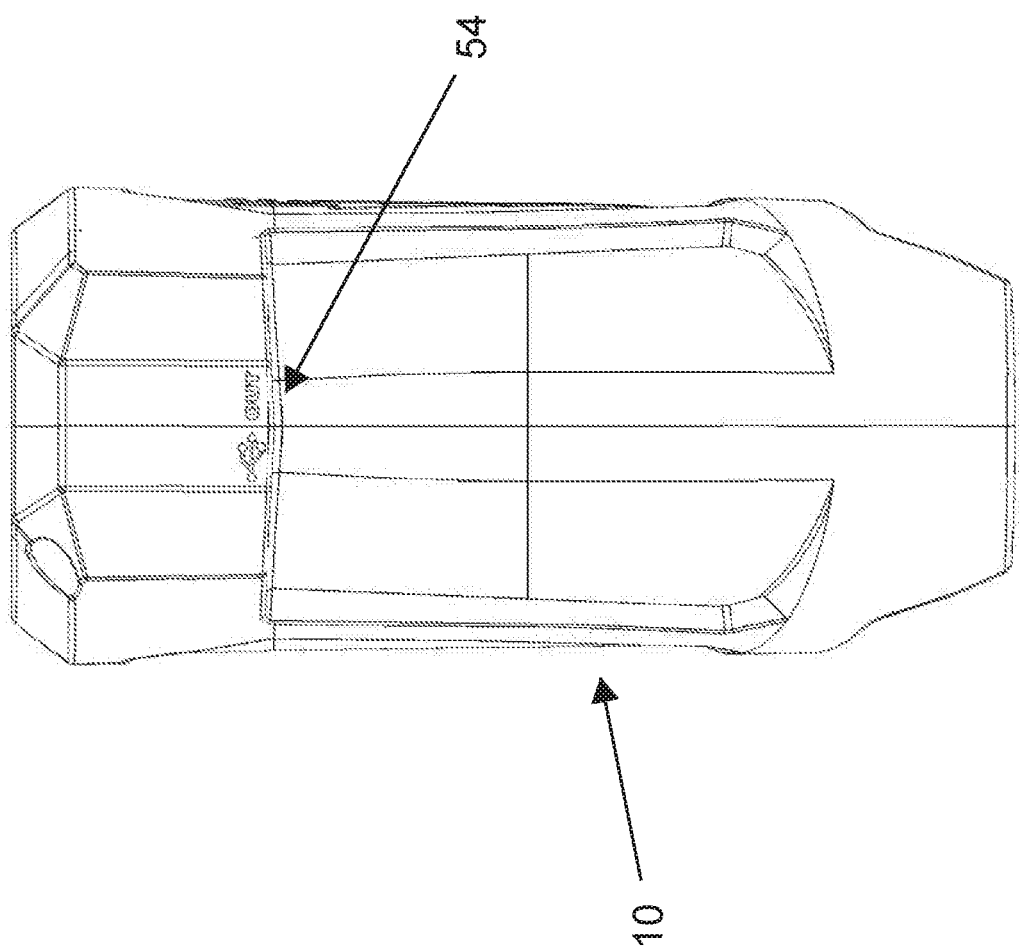
FIG. 17 is another side view of the battery connector shown in FIG. 11.
Figure 18:
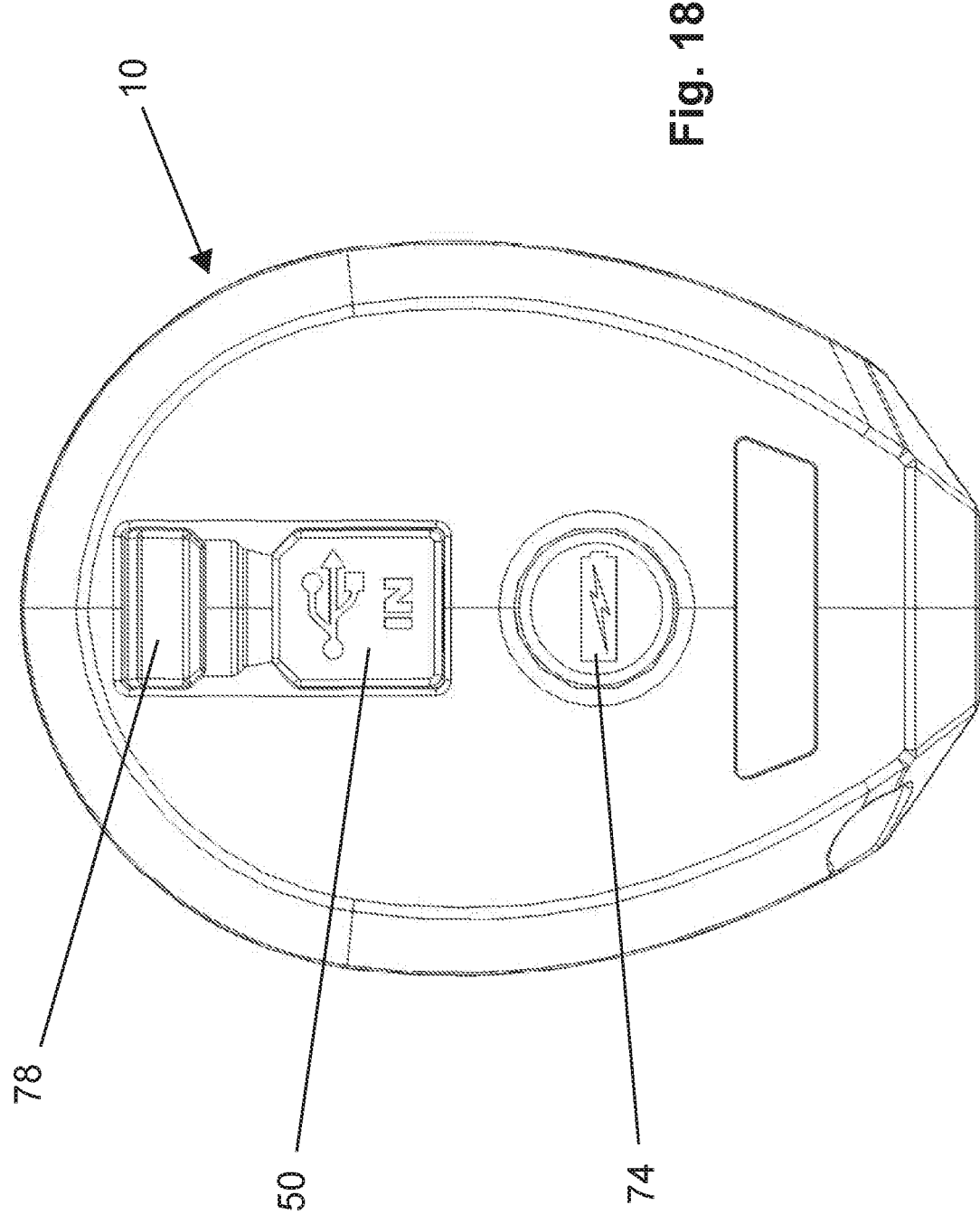
FIG. 18 is an end view of the battery connector shown in FIG. 11.
Figure 19:
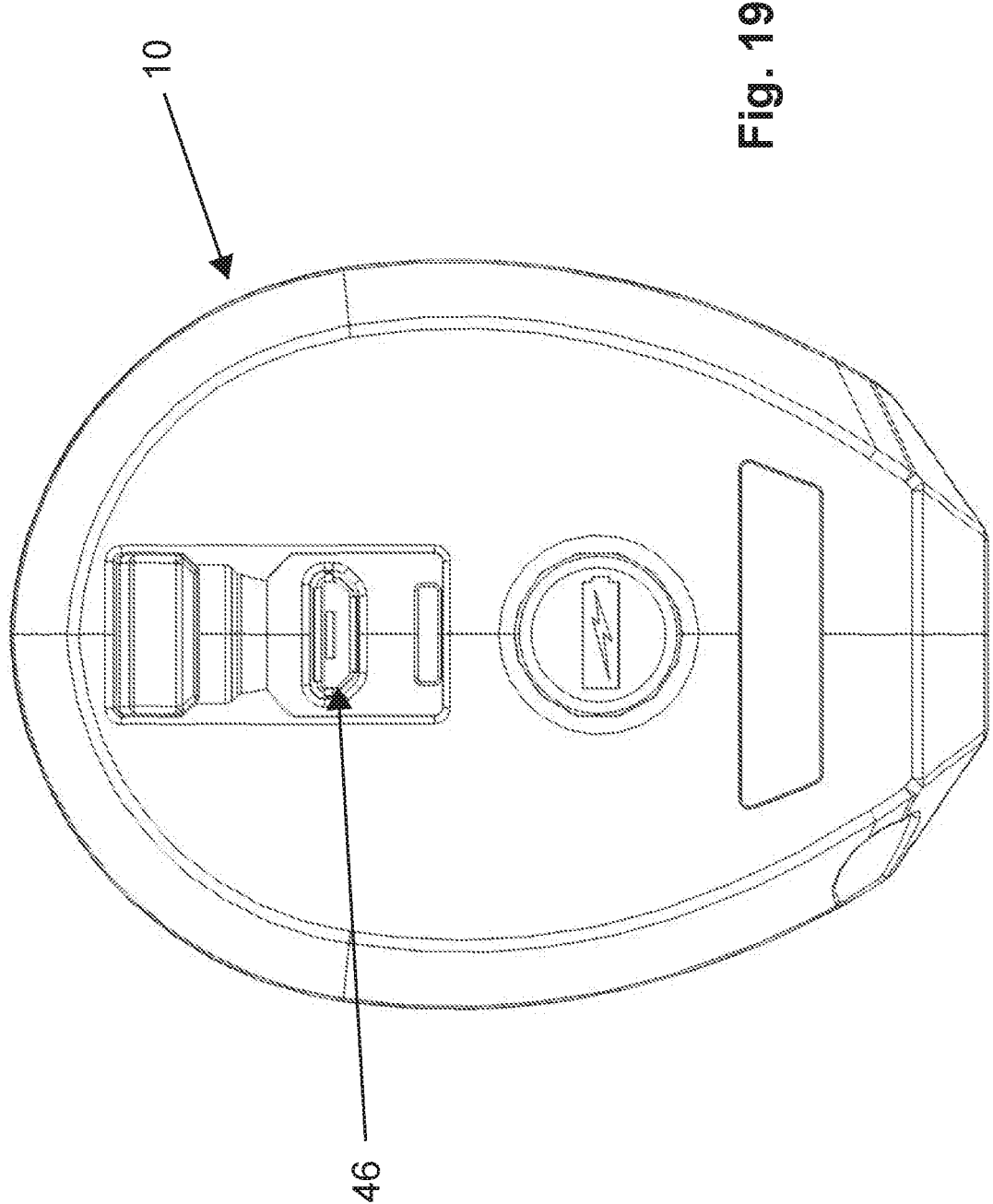
FIG. 19 is an end view of the battery connector as shown in FIG. 18, illustrated with the USB input cover removed.
Figure 20:
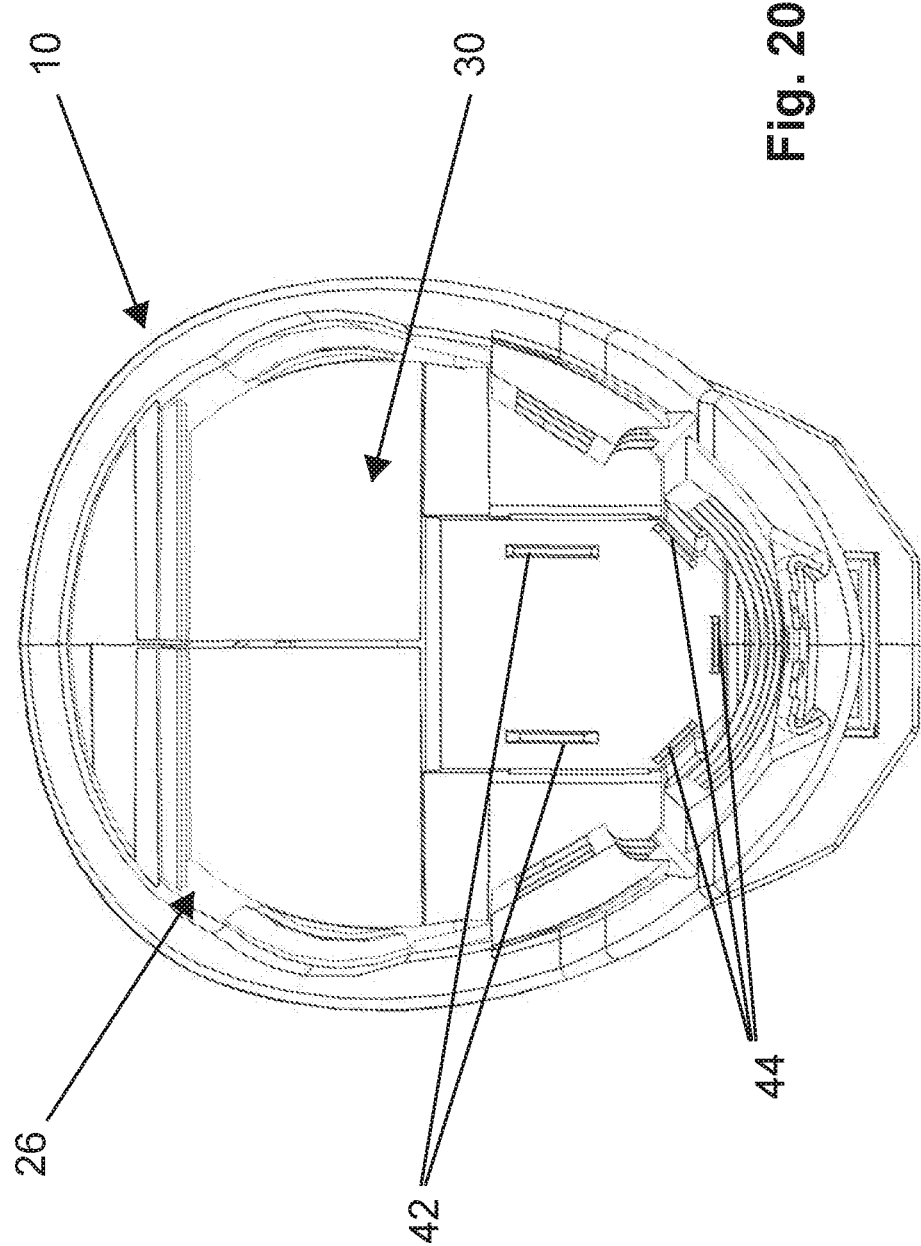
FIG. 20 is another end view of the battery connector shown in FIG. 11.
Figure 21:
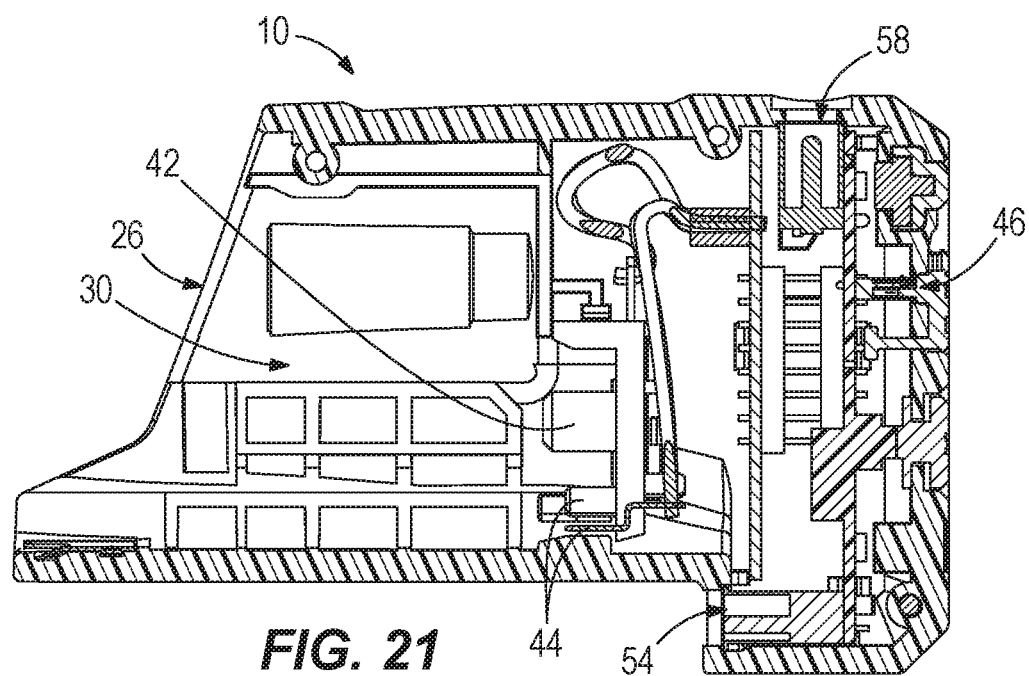
FIG. 21 is a cross-sectional view of the battery connector shown in FIG. 11.

Terminals are electrically connected to the cells 86 and are operable to electrically connect the battery pack 14 to the connector 10 and to the devices (see FIGS. 32-33). The pack terminals include power terminals (e.g., female terminals 90) and communication terminals (e.g., plate terminals 94). As shown in FIG. 10, the female power terminals 90 are configured to receive the male power terminals 42 of the connector 10 (or of the device) so that power is transferrable between the connector 10 and the battery pack 14 (or the device). As shown in FIG. 9, the pack communication terminals 94 are configured to be engaged by the communication terminals 44 of the connector 10 (or of the device) so that data (e.g., information, instructions, etc.) is transferrable between the connector 10 and the battery pack 14 (or the device).

The illustrated battery pack 14 does not include a battery controller. The battery pack 14 includes a temperature sensor (e.g., a thermistor) sensing and providing a signal representative of a temperature of the battery pack 14 (e.g., of the battery pack 14 as a whole, of one or more cells, etc.).

In other constructions (not shown), the battery pack 14 may include a battery electronic controller (not shown) configured to determine characteristics of the battery pack 14 (e.g., pack temperature, cell temperature, pack voltage, cell voltage, etc.), to communicate pack characteristics, to control operation of the battery pack 14, etc.

The pack housing 82 provides a support portion 98 engageable with the support portion 26 of the connector 10 (or of the device). In the illustrated construction, the support portion 98 includes a tower 102 receivable in the receptacle 30 of the connector 10 (or of the device). In other constructions (not shown), the battery pack 14 and the connector 10 (and the device) may include a different support arrangement, such as, for example, a slide-on arrangement including inter-engaging rails and grooves.

The battery pack 14 includes a latching portion cooperating with the latching portion of the connector 10 (or of the device). In the illustrated construction, the pack latching portion includes a number of (e.g., two) projections 106 corresponding to the number of (e.g., two) recesses 34 on the connector 10 (and the device). An actuator 110 is operable to adjust the latching mechanism between a latching condition, in which each projection 106 engages a recess 34 to connect the battery pack 14 to the connector 10 (or the device), and a release position, in which the projection(s) 106 and recess(es) 34 are disengaged to allow relative movement (e.g., removal or insertion) of the battery pack 14 and the connector 10 (or the device).

Figure 29A:
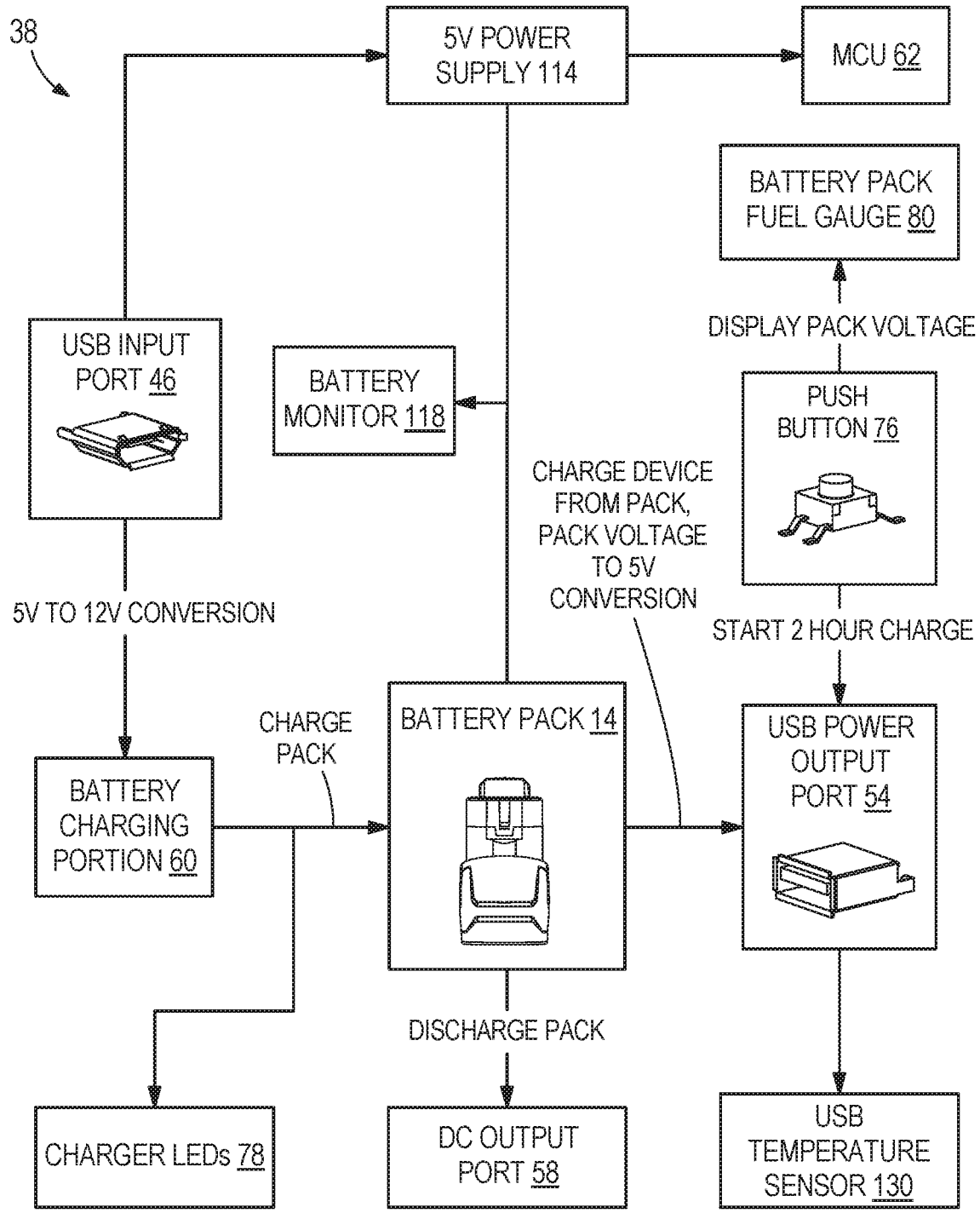
FIG. 29A is a block diagram illustrating the circuit of the battery connector shown in FIG. 1.
Figure 29B:
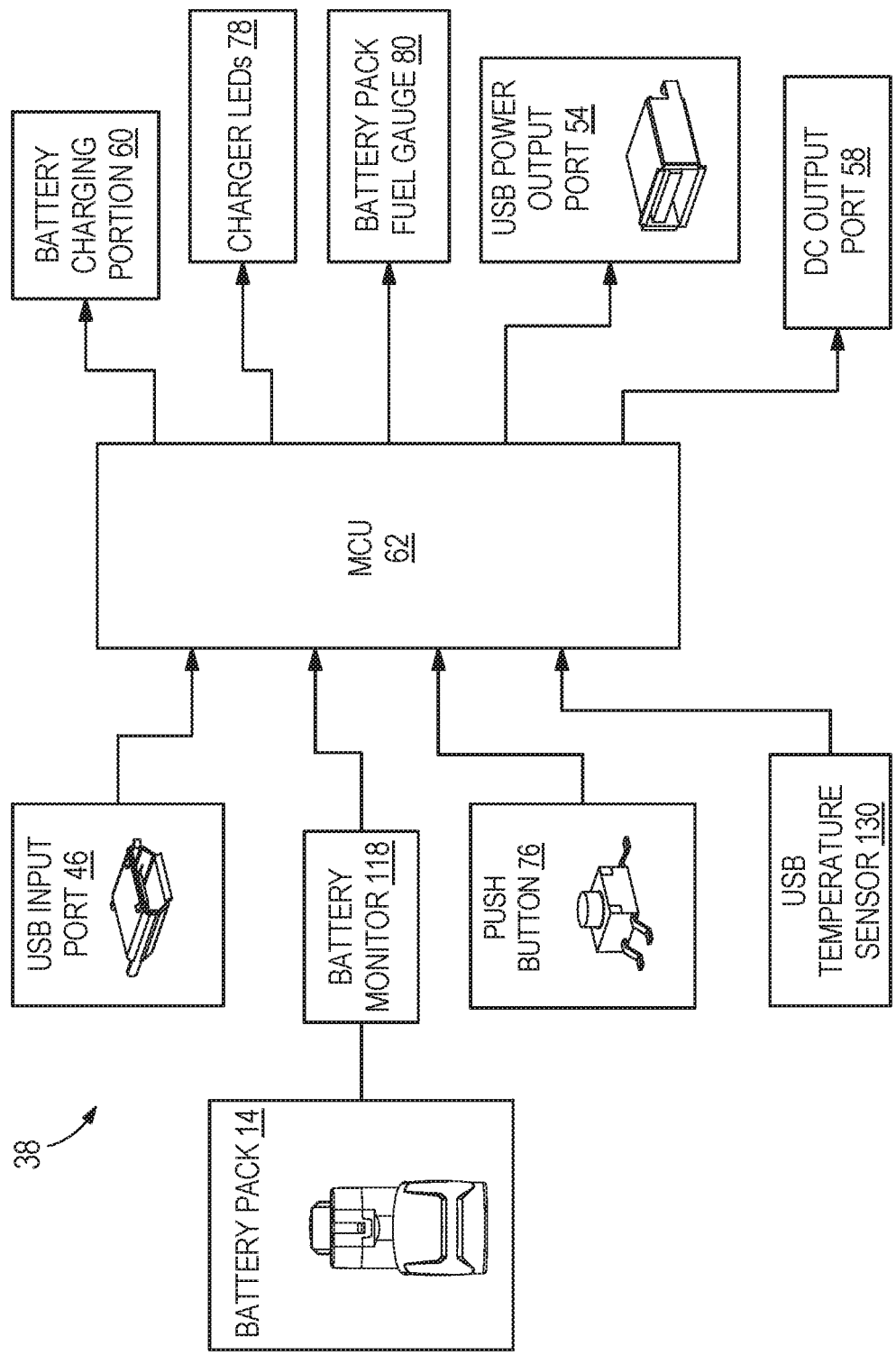
FIG. 29B is a block diagram further illustrating the circuit of the battery connector shown in FIG. 1 including control inputs received by a microcontroller and control outputs provided by the microcontroller.

FIG. 29A includes a block diagram of circuitry of the battery connector 10. FIG. 29B is a block diagram further illustrating circuitry of the battery connector 10 including control inputs received by the connector controller 62 (i.e., MCU 62) from various components and control outputs provided by the connector controller 62 to various components.

As mentioned above, the circuit 38 includes the battery charging portion 60, having a charging controller (not shown), and the connector controller 62. The circuit 38 includes a power supply portion 114 for the controller 62. A battery monitor portion 118 is configured to monitor the battery pack 14 (e.g., the connection status, characteristics of the battery pack 14 and the cells 86, etc.) and provide an input related to one or more monitored battery pack characteristics to the connector controller 62. The connector controller 62 is configured to control the charger LEDs 78 to indicate a charging condition of the battery connector 10. For example, as mentioned above, a solid green light indicates charging is complete, a solid red light indicates charging, and blinking LEDs indicate a fault.

The input port 46 is coupled to the connector controller 62 to allow the connector controller 62 to determine whether power is being received at the input port 46. The connector controller 62 is also operable to detect the type of input device connected to the input port 46. The connector controller 62 receives an input from a USB temperature sensor 130 that monitors a temperature of the USB output port 54. Additionally, the connector controller 62 receives an input from the push button 76 and controls other components of the circuit 38 based on the received input from the push button 76. For example, in response to receiving a signal from the push button 76 indicating that the push button 76 has been pressed, the connector controller 62 controls the battery charging portion 60 to begin providing power through the USB power output port 54 (e.g., a two-hour charge) and displays the voltage of the battery pack 14 on the battery pack FUEL gauge LEDs 80.

In some embodiments, the connector controller 62 controls the battery charging portion 60 to output power from the battery pack 14 via the DC output port 58. The DC output port 58 (i.e., a low-voltage power supply connector) is electrically connected to a corresponding connector of a heated jacket to provide DC power to the heated jacket; however, other powered devices (not shown) having a similar input plug may be connected to the DC output port 58 to receive power therefrom.

The battery pack 14 may be usable with (see FIGS. 32-33) various motorized and non-motorized devices (referred to as a "device"). The battery pack 14 may be used to power tools such as a drill 202, a pipe cutter 204, an impact driver 206, a saw (e.g., a reciprocating saw 208, a circular saw), a vacuum (not shown), etc. The battery pack 14 may also be usable with non-motorized devices, such as sensing devices (e.g., a visual inspection camera 212, an infrared sensor 214 (such as a thermometer or thermal imaging camera), a clamp-type multimeter 216, a wall scanner 218 (a "stud finder"), etc.), lighting devices (not shown; e.g., a flashlight, a floodlight, etc.), audio devices (e.g., a radio, a speaker, etc.), a temperature-controlled (e.g., heated and/or cooled) garment 220, etc.

Each device generally includes a device housing 224 providing a support portion 228 operable to support the battery pack 14 on the device. Each device also includes a latching portion (not shown but similar to the latching portion (the recesses 34) of the battery connector 10) to releasably connect the battery pack 14 to the device housing 224.

Each device includes an electric circuit (not shown) with device terminals (not shown; similar to the connector terminals 42) to electrically connect to the battery terminals for power transfer and, if provided, communication. Based on the type of device, the device includes a load (e.g., a motor, sensing circuitry, a lighting component, audio circuitry, a heating/cooling device, etc.).

Each device may also include a device electronic controller (not shown) operable to control operation of the device and/or of the battery pack. The device controller may communicate and cooperate with the battery controller.

The battery connector 10 and the battery pack 14 may be similar to those described and illustrated in U.S. Patent Application Publication No. US 2011/0108538 A1, published May 12, 2011, or in U.S. Patent Application Publication No. US 2015/0271873 A1, published Sep. 24, 2015, the entire contents of both of which are hereby incorporated by reference.

Although the invention has been described in detail with reference to certain embodiments, variations and modifications exist within the scope and spirit of one or more independent aspects of the invention as described.

One or more independent features and/or independent advantages of the invention may be set forth in the claims.

We claim:

1. An electrical combination comprising:
    a battery connector including
        a housing with a support portion for a battery pack, and
        a circuit supported by the housing, the circuit including
            a universal serial bus (USB) input terminal connectable to a USB cable for receiving power,
            a charging terminal connectable to a pack terminal of the battery pack,
            an output terminal that includes at least one of a direct current (DC) output port or a USB power output port, wherein the output terminal is configured to output power from the battery pack to a powered device electrically connected to the output terminal,
            a battery charging portion operable to receive power from the USB input terminal and to output a charging current to the charging terminal to charge the battery pack, and
            an electronic controller configured to:
                determine that power is being received at the USB input terminal, and
                in response to determining that power is being received at the USB input terminal, prevent power output to the output terminal.

2. The electrical combination of claim 1, further comprising the battery pack, the battery pack being removably coupled to the housing.

3. The electrical combination of claim 2, wherein the battery connector includes a receptacle configured to receive a tower portion of the battery pack.

4. The electrical combination of claim 2, wherein the battery pack is a power tool battery pack.

5. The electrical combination of claim 1, wherein the electronic controller is further configured to
    determine a power input received by the USB input terminal,
    in response to determining that a first power input is received by the USB input terminal, control the battery charging portion to operate at a first charging rate, and
    in response to determining that a second power input is received by the USB input terminal, control the battery charging portion to operate at a second charging rate, the second charging rate being different than the first charging rate.

6. The electrical combination of claim 5, wherein the first power input is provided by a direct current (DC) source with a first voltage, and the second power input is provided by an alternating current (AC) source with a second voltage that is higher than the first voltage, the first charging rate being lower than the second charging rate.

7. The electrical combination of claim 1, wherein the circuit includes the direct current (DC) output port and the USB power output port.

8. The electrical combination of claim 1, wherein the circuit further includes a second output terminal operable to output power from the battery pack, the second output terminal being a different type than the first-mentioned output terminal.

9. A method of charging a battery pack, the method comprising:
    providing a battery connector including a housing with a support portion for the battery pack and a circuit with a universal serial bus (USB) input terminal and a battery charging portion;
    supporting the battery pack on the support portion;
    electrically connecting the battery pack to the circuit of the battery connector;
    electrically connecting a USB cable between a power source and the USB input terminal of the battery connector;
    receiving, by the battery charging portion of the circuit, power from the USB input terminal;
    outputting a charging current from the battery charging portion to the battery pack to charge the battery pack;
    electrically connecting an output terminal that includes at least one of a direct current (DC) output port or a USB power output port to a powered device;
    outputting, with the output terminal, power from the battery pack to the powered device;
    determining, with an electronic controller of the circuit, that power is being received at the USB input terminal; and
    preventing, in response to determining that power is being received at the USB input terminal, with the electronic controller, power output to the output terminal of the circuit.

10. The method of claim 9, wherein the supporting the battery pack on the support portion includes removably coupling the battery pack to the housing of the battery connector.

11. The method of claim 10, wherein the supporting the battery pack on the support portion includes receiving a tower of the battery pack in a receptacle of the battery connector.

12. The method of claim 9, wherein the battery pack is a power tool battery pack.

13. The method of claim 9, further comprising:
    determining, with the electronic controller of the circuit, a power input received by the USB input terminal;

in response to determining that a first power input is received by the USB input terminal, controlling, with the electronic controller, the battery charging portion to operate at a first charging rate; and in response to determining that a second power input is received by the USB input terminal, controlling, with the electronic controller, the battery charging portion to operate at a second charging rate, the second charging rate being different than the first charging rate.

14. The method of claim 13, wherein the first power input is provided by a direct current (DC) source with a first voltage, and the second power input is provided by an alternating current (AC) source with a second voltage higher than the first voltage, the first charging rate being lower than the second charging rate.

15. The method of claim 9, wherein the circuit includes the direct current (DC) output port and the USB power output port.

16. The method of claim 9, further comprising, in response to determining that power is being received at the USB input terminal, preventing, with the electronic controller, power output to a second output terminal of the circuit, the second output terminal being operable to output power from the battery pack and being a different type than the first-mentioned output terminal.

17. An electrical combination comprising:
a battery connector separate from a powered device and including
  a housing with a support portion for a battery pack, and
  a circuit supported by the housing, the circuit including
    an input terminal connectable to a power source,
    a charging terminal connectable to a pack terminal of the battery pack,
    an output terminal electrically connectable to the powered device and operable to output power from the battery pack to the powered device,
    a battery charging portion operable to receive power from the input terminal and to output a charging current to the charging terminal to charge the battery pack, and
    an electronic controller configured to:
      determine that power is being received at the USB input terminal, and
      prevent, in response to determining that power is being received at the USB input terminal, power output to the output terminal.

18. The electrical combination of claim 17, further comprising the powered device, the powered device including a garment configured to receive the output power from the battery pack to adjust a temperature of the garment.

* * * * *